United States Patent [19]
Wolf et al.

[11] Patent Number: 5,485,417
[45] Date of Patent: Jan. 16, 1996

[54] PROCESS AND ARRANGEMENT FOR CONTROLLING A VIBRATION DAMPER

[75] Inventors: Fritz Wolf, Bergrheinfeld; Thomas Kutsche, Schweinfurt; Manfred Röder, Schwebheim, all of Germany

[73] Assignee: Fichtel & Sachs AG, Schweinfurt, Germany

[21] Appl. No.: 824,603

[22] Filed: Jan. 23, 1992

[30] Foreign Application Priority Data

Jan. 31, 1991 [DE] Germany .......................... 41 02 827.9
Nov. 2, 1991 [DE] Germany .......................... 41 36 224.1

[51] Int. Cl.$^6$ ..................... B60G 17/015; B60G 17/033; B60G 21/05
[52] U.S. Cl. ................. 364/424.01; 364/424.05; 280/707
[58] Field of Search ............ 364/424.01, 424.05, 364/426.01, 508; 280/707

[56] References Cited

U.S. PATENT DOCUMENTS

| 4,586,728 | 5/1986  | Tokunaga et al.   | 280/707    |
| 4,613,154 | 9/1986  | Tanaka et al.     | 280/707    |
| 4,621,832 | 11/1986 | Nakashima et al.  | 280/707    |
| 4,765,648 | 8/1988  | Mander et al.     | 280/707    |
| 4,787,650 | 11/1988 | Doi et al.        | 280/707    |
| 4,949,989 | 8/1990  | Kakizaki et al.   | 280/707    |
| 4,984,819 | 1/1991  | Kakizaki et al.   | 280/707    |
| 4,989,148 | 1/1991  | Gürke et al.      | 364/424.05 |
| 5,054,813 | 10/1991 | Kakizaki          | 280/707    |
| 5,124,917 | 6/1992  | Kanamori          | 364/424.05 |
| 5,144,559 | 9/1992  | Kamimura et al.   | 364/424.05 |
| 5,154,442 | 10/1992 | Milliken          | 280/702    |
| 5,162,996 | 11/1992 | Matsumoto et al.  | 364/424.05 |
| 5,168,448 | 12/1992 | Matsumoto et al.  | 364/424.05 |
| 5,175,687 | 12/1992 | Tsutsumi et al.   | 364/424.05 |
| 5,361,209 | 11/1994 | Tsutsumi          | 364/424.05 |

FOREIGN PATENT DOCUMENTS

| 0115202 | 8/1984  | European Pat. Off. . |
| 0139145 | 5/1985  | European Pat. Off. . |
| 0162449 | 11/1985 | European Pat. Off. . |
| 0162818 | 11/1985 | European Pat. Off. . |
| 0217401 | 4/1987  | European Pat. Off. . |
| 0249246 | 12/1987 | European Pat. Off. . |
| 0265911 | 5/1988  | European Pat. Off. . |
| 0344493 | 12/1989 | European Pat. Off. . |
| 0358231 | 3/1990  | European Pat. Off. . |
| 2220176 | 1/1990  | United Kingdom . |
| 2234211 | 1/1991  | United Kingdom . |
| 2239506 | 7/1991  | United Kingdom . |
| 2246184 | 1/1992  | United Kingdom . |
| 2255390 | 11/1992 | United Kingdom . |
| 2261715 | 5/1993  | United Kingdom . |
| 2262151 | 6/1993  | United Kingdom . |

OTHER PUBLICATIONS

*Patent Abstracts of Japan*, vol. 14, No. 432 (Sep. 17, 1990) (featuring abstract of JP2171310 published Jul. 3, 1990).

*Patent Abstracts of Japan*, vol. 10, No. 142 (May 24, 1986) (featuring abstract of JP61001520 published Jan. 7, 1986).

Primary Examiner—Kevin J. Teska
Assistant Examiner—Tyrone V. Walker
Attorney, Agent, or Firm—Brumbaugh, Graves, Donohue & Raymond

[57] ABSTRACT

The process according to the invention allows the adjustment of different damping characteristics of a motor vehicle damper taking into account the state of travel of the motor vehicle and damping requirement defining quantities depending on the travelling state according to an operating mode which can be preselected by the driver. The switch takes place as a function of a value of the total damping requirement determined from the instantaneous values of the damping requirement defining quantities according to a power function. The damping characteristic which is most desirable at each moment in time can be defined in real time. The process according to the invention can be used for various vehicles owing to adaptation of parameters which determine the power function.

20 Claims, 13 Drawing Sheets

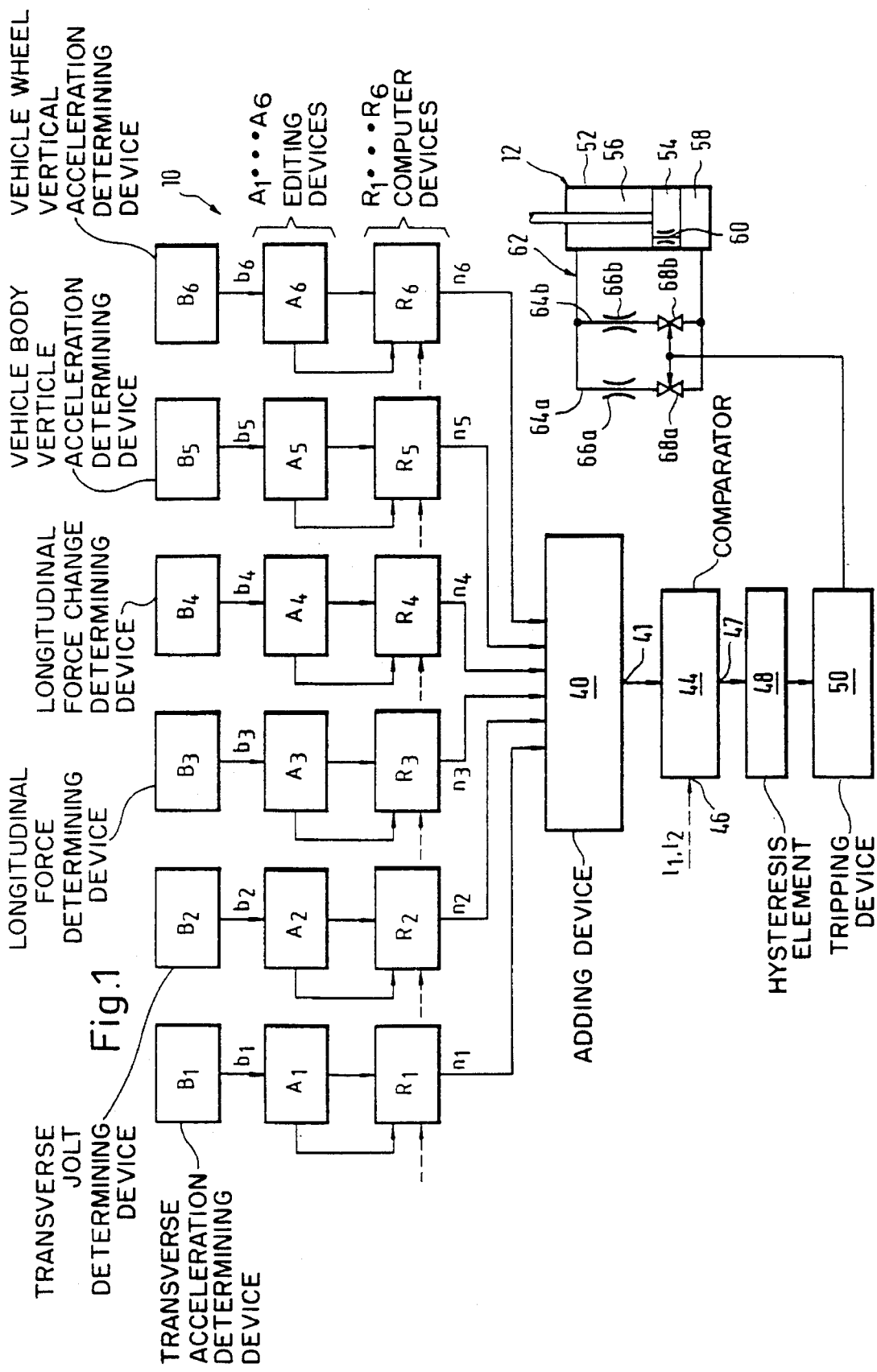

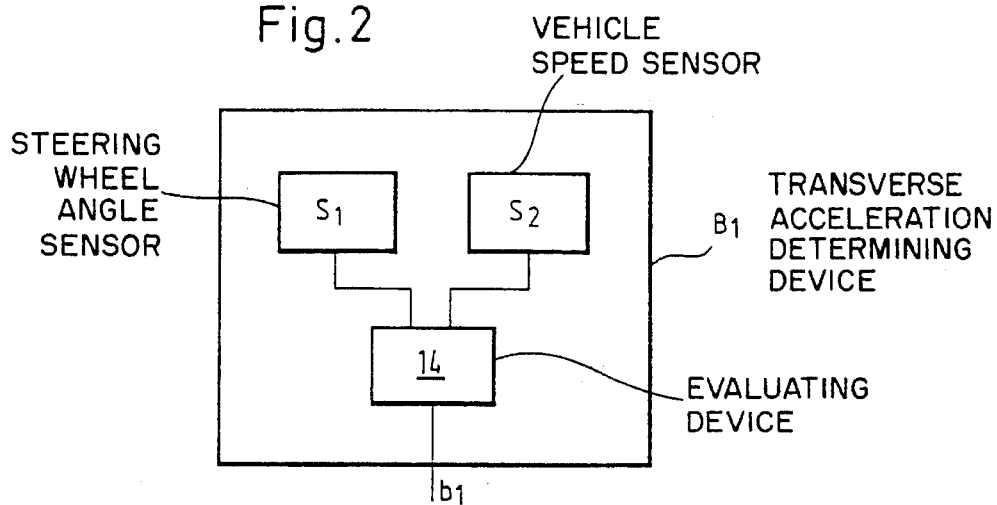
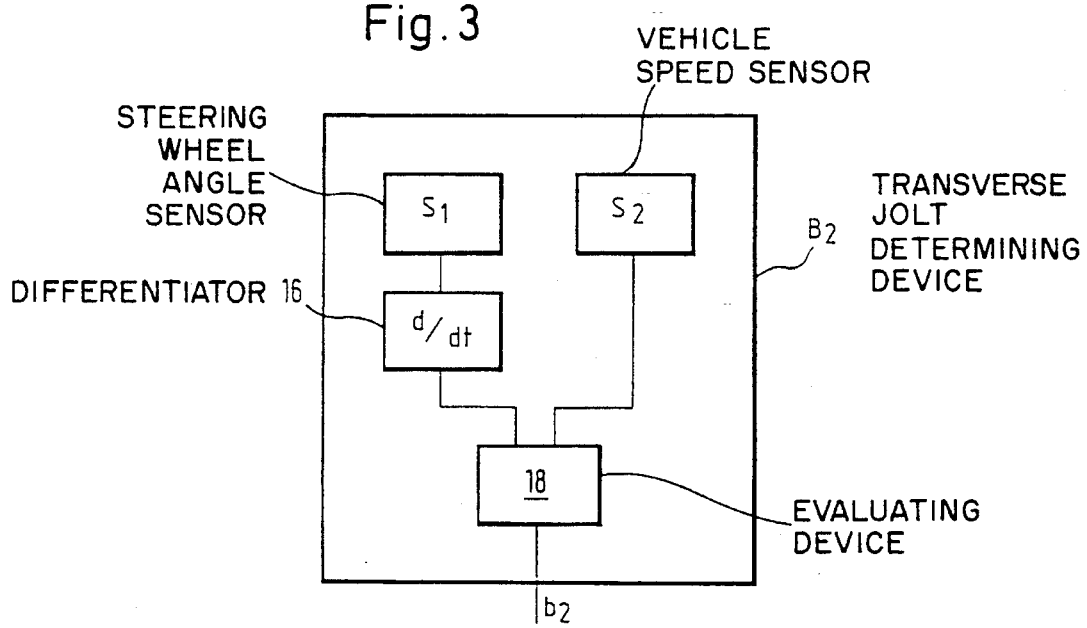

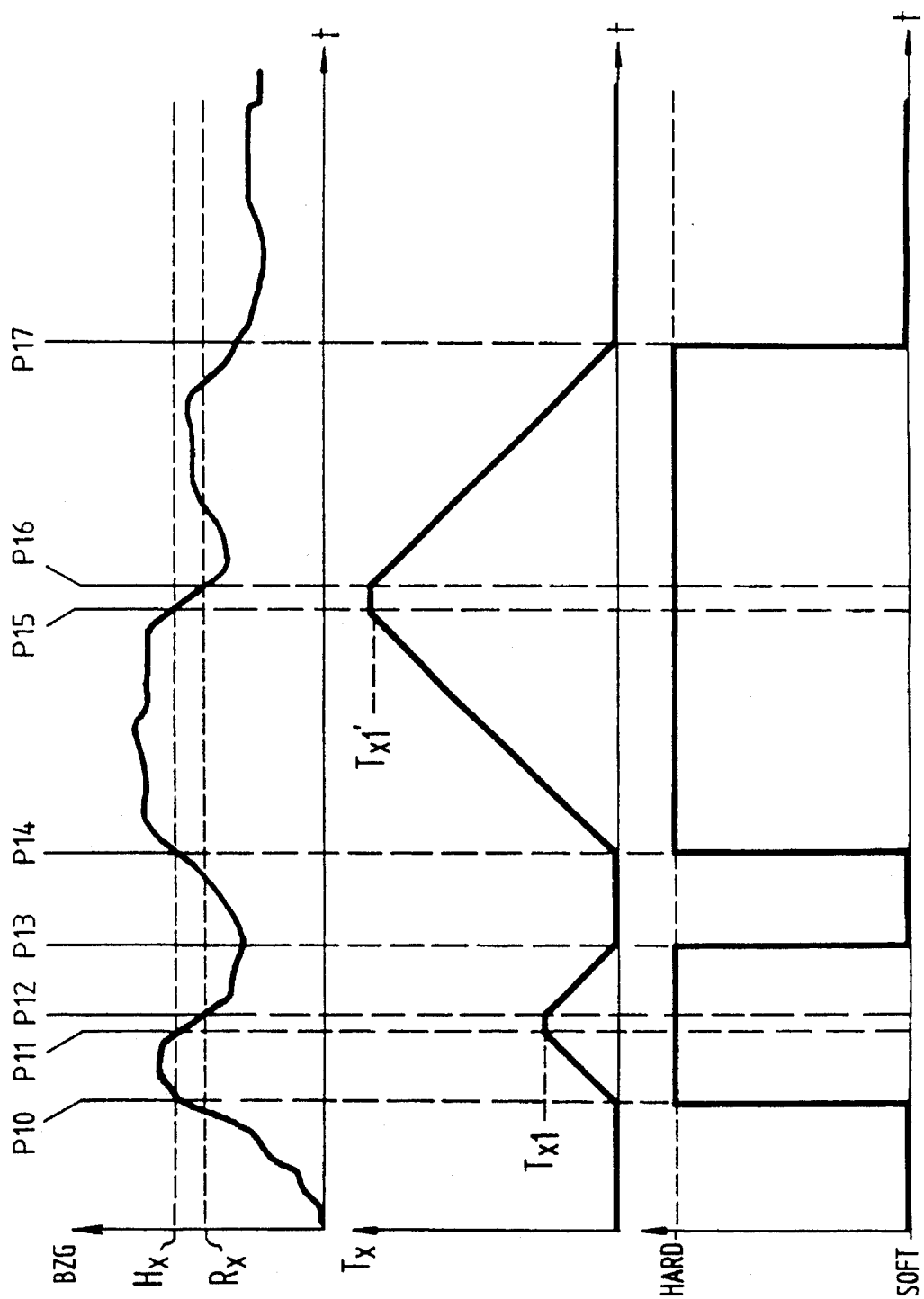

PROCESS AND ARRANGEMENT FOR CONTROLLING A VIBRATION DAMPER

BACKGROUND OF THE INVENTION

The invention relates to a process for adjusting different damping stages of a motor vehicle damper as a function of damping requirement defining quantities such as transverse acceleration, transverse jolt, longitudinal force, change of longitudinal force, frequency-evaluated vehicle body acceleration and frequency-evaluated wheel acceleration.

STATEMENT OF THE PRIOR ART

It is known from EP-A1 0 344 493, with a so-called active damping system for a motor vehicle, to change the damping power of one or more vibration dampers in that different fluid pressures are built up from an external pressure fluid source in the respective vibration damper. The build up of different fluid pressures in the vibration damper is controlled as a function of several damping requirement defining quantities. The averaged distance between the vehicle body and the ground, the averaged pitch angle and the averaged rocking angle are mentioned as damping requirement defining quantities in the specification. It is also mentioned that it is also possible to use the time derivatives of said damping requirement defining quantities for controlling the respective vibration damper.

The body acceleration of the vehicle body and the wheel acceleration of the chassis as a consequence of the respective state of the road are also mentioned as possible damping requirement defining quantities and it is proposed that a computer or microprocessor record the average distance from the ground, the average rocking angle and the average pitch angle or the timed variation in these quantities in each case. This is equivalent to the computer or microprocessor breaking each movement of the vehicle body relative to the ground into a reciprocating movement, a rocking movement and a pitching movement. This allows the different types of movement of the vehicle body to be counteracted in different ways, i.e. in particular with different progressiveness.

The changes or corrections in the supporting forces of the vibration dampers calculated separately for correcting the respective lift and for correcting the respective rocking position and for correcting the respective pitch angle can be linked to one another by mere addition in the sense that the variation of the supporting force actually undertaken at each vibration damper corresponds in each case to the sum of individual corrections which have been calculated for a designed change of the lift or of the rocking angle or of the pitch angle.

SUMMARY OF THE INVENTION

It has accordingly been found that the comfort of travel can be particularly promoted without losses in safety by the following steps:

(a) the instantaneous values of the damping requirement defining quantities are determined;

(b) the instantaneous values of the damping requirement defining quantities are converted according to a power function into instantaneous values of a damping requirement contribution, wherein the base comprises the damping requirement defining quantity and the exponent defines the relative significance of the respective damping requirement defining quantity within a total damping requirement;

(c) the instantaneous values of the damping requirement contributions of the individual damping requirement defining quantities are added to the total damping requirement value;

(d) the total damping requirement value is compared with a damping stage switch value;

(e) when the total damping requirement value and the damping stage switch value are substantially equal, the vibration damper is switched over to the next respective damping stage.

The process according to the invention is applicable, in particular, with so-called adaptive damping power control. This means, for example, that the damping resistance is changed in a vibration damper by influencing damping valves or by connecting and disconnecting damping valves in a parallel or series connection.

The process according to the invention can be applied to the individual control of vibration dampers, but can also be applied, for example, to the common control of the vibration dampers allocated to a certain axle and finally also for the common control of all vibration dampers of a vehicle. In other words, it is possible to compare the total damping requirement value for each vibration damper with a damping stage switch value specific to the vibration damper and to use the result of comparison in each case only for controlling this vibration damper. It is also possible to compare the total damping requirement value for the vibration dampers of each axle with a damping stage switch value specific to the axle and to use the result of comparison simultaneously for vibration damper control of the vibration dampers of this axle. Finally, it is also possible to compare the total damping requirement value with a damping stage switch value common to all vibration dampers of the vehicle and to use the result of comparison simultaneously for influencing all vibration dampers of the vehicle.

On the other hand, it is also possible to establish the total damping requirement values specific to the vibration damper or specific to the axle, for example by using the vertical accelerations of vehicle body and front axle for calculating the total damping requirement value at the front axle and by using the body accelerations and axle accelerations at the rear axle for calculating the total damping requirement value at the rear axle.

When applying the invention it has been found that: if the damping requirement contributions of the individual damping requirement defining quantities are calculated according to power functions and these damping requirement contributions are superimposed by addition, it is directly possible to carry out a change-over between two damping stages. It should be taken into consideration that the damping requirement defining quantities are plotted on the abscissa axis and the damping requirement contributions running according to a power function on the ordinate axis in a Cartesian coordinate system. In this co-ordinate system, the damping stage switch value is entered as a horizontal line parallel to the abscissa axis. If the trend of a damping requirement contribution is initially considered, the switch is located at the point where the corresponding power curve intersects the straight line which represents the damping stage switch value and is parallel to the abscissa axis. The trend of the respective power function in the region of the straight lines representing the damping stage switch value can be adjusted such that the inclination of the curve predetermined by the power function is relatively slight in the region of the switch point. Slighter variations in the respective damping requirement defining quantity in turn lead only to slighter variations in the corresponding damping requirement contributions.

This means that the respective damping requirement defining quantity is switched within relatively slight variations. However, if several switches are to be made, for example from a soft damping stage to a medium damping stage and from the medium damping stage to a hard damping stage, this means that although the requirement for a small ascent in the curve can easily be satisfied for one switch point, a pronounced ascent in the curve representing the respective damping requirement defining quantity exists in one other or several other switch points. If the instantaneous value of the damping requirement defining quantity experiences slight variations in another such switch point, very great variations in the respective associated damping requirement contribution correspond to these slight variations under certain circumstances. This means that the switch point can no longer be established with the necessary accuracy because even the slightest variations in the damping requirement defining quantity lead to a switch. To remedy this drawback, i.e. to allow the respective switch point to be established with sufficient accuracy even with more than two damping stages, it is also proposed that when a threshold value of each damping requirement defining quantity is exceeded, the respective power function is altered such that during a further ascent in this damping requirement defining quantity, a zero displacement of the associated power function takes place to the threshold value of the damping requirement defining quantity (abscissa displacement) and to the damping requirement contribution value associated according to the old power function (ordinate displacement). It is then directly possible to allow the power function with a slight inclination in each case to intersect the horizontal straight line associated with the respective switch point even in the second and subsequent switch points.

If a change in the power function is proposed, it is also possible, on the occasion of this change in the power function, to change a multiplication factor in this power function, this multiplication factor being related by multiplication to the base.

Since the threshold value and the multiplication factor are selected according to the desired operating mode, the switch-over behaviour of the vibration damper can be varied. The multiplication factor and the threshold value can be determined once and for all at the factory. However, it is also conceivable to leave the selection of the size of the multiplication factor and of the threshold value to the driver, for example in that the driver can select between comfortable travel and sports travel.

The process according to the invention can be carried out automatically by means of an arrangement which is characterised as follows:

(a) determination arrangements are provided for determining the instantaneous values of the damping requirement defining quantities;

(b) a computer system is provided which converts the instantaneous values of the damping requirement defining quantities according to a power function into instantaneous values of a damping requirement contribution, the computer system having a base input for inputting the respective value of the damping requirement defining quantity, an exponent input for inputting the relative significance of the respective damping requirement defining quantity within the total damping requirement and a computer output for outputting the respective instantaneous values of the damping requirement contribution;

(c) an adding device is connected to the computer output, which adding device adds up the instantaneous values of the damping requirement contributions of the individual damping requirement defining quantities and has a summation output for outputting a total damping requirement value;

(d) a comparator is provided which has a first comparator input connected to the adding device and a second comparator input for inputting a damping stage switch value and a comparator output for outputting a damping stage control signal when the total damping requirement value and the damping stage switch value are approximately equal;

(e) a tripping device is connected to the comparator output which switches the vibration damper to the respective next damping stage when a damping stage control signal appears at the comparator output.

In this arrangement according to the invention, the determination arrangements can be formed directly by sensors which determine, for example, the vertical body acceleration or the vertical wheel acceleration as a function of the state of the road. These vertical accelerations can be evaluated as a function of amplitude and frequency, which is possible, for example, due to the subsequent connection of a band pass filter after the respective acceleration sensor. On the other hand, it is also possible to determine individual damping requirement defining quantities from different travel state ranges. Thus, for example, the so-called transverse acceleration can be determined from the range of the degree of lock of the steering wheel and the range of the speed of travel. In this case, the determination arrangement for determining the damping requirement defining quantity "transverse acceleration" is composed of a goniometer which determines the degree of lock of the steering wheel, a tachometer which determines the speed of travel and a computer unit which links these two quantities to one another.

The computer system calculating the power functions can be formed from individual computer units for the different damping requirement defining quantities. However, it is obviously also possible to calculate the damping requirement contributions on the basis of the individual damping requirement defining quantities in a central computer.

A hysteresis element can optionally be provided between the comparator arrangement and the tripping arrangement to prevent multiple to-and-fro switching between two damping stages when the damping stage switch value is passed over slowly and also to prevent high-frequency disturbances of high amplitude in the total damping requirement value from leading to an undesirable switch over between different damping stages.

If more than two damping stages are provided, it is proposed for the reasons mentioned above in conjunction with the explanation of the process that each determination arrangement be allocated a threshold value comparator which loads an additional input device of the computer system when a threshold value of the respective damping requirement defining quantity is exceeded in order to change the respective power function such that during a further ascent in this damping requirement defining quantity a zero displacement of the associated power function takes place to the threshold value of the damping requirement defining quantity (abscissa displacement) and to the damping requirement contribution value associated according to the old power function (ordinate displacement).

This allows the additional input device to be designed for the input of a factor which is to be multiplied by the base.

In this arrangement, the base input of the computer system, the threshold value comparator and the additional input device can be connected to a tabulator which makes available the threshold value and/or the multiplication factor according to an operating mode or type of running, respectively, which is firmly adjusted or can be adjusted by the driver.

The invention also relates to a process for operatively influencing a damping support system arranged between a chassis and vehicle body of a motor vehicle, which system has at least one damping module arranged between the chassis and the vehicle body, with which process the damping properties of at least a part of the damping modules are changed as a function of at least one running state quantity between at least two damping characteristics, namely a harder and a softer damping characteristic, in different transfer directions (hard-soft, soft-hard).

With such processes, the running state quantities are prepared in practice in the form of sensor signals or quantities calculated from such sensor signals. The sensor signals and therefore also the running state quantities are invariably subject to certain variations, for example owing to signal noise. In the region of a change of the damping properties of the damping modules from the harder to the softer damping characteristic or from the softer to the harder damping characteristic, these variations are accompanied by a frequent switch between the damping characteristics. This frequent switch has a negative effect on the service life of the damping modules and on the comfort of travel.

The object of the invention is therefore to provide a process of the type described above by means of which a frequent switch between the damping characteristics can be reliably avoided.

According to the invention, this object is achieved in that after a change in one transfer direction, a change in the other transfer direction is permitted only after a predetermined period of time has elapsed. Owing to this time hysteresis, a maximum rate of change is predetermined for the damping modules. This maximum rate or the predetermined time can be fixed such that the service life of the damping modules and the comfort of travel are not essentially impaired by a switch with this rate.

To allow a change in the direction of the harder damping characteristic to be made immediately in view of the safety of travel but at the same time to avoid a continuous switch to and fro between the damping characteristics, it is proposed that, after a change in the direction of the harder damping characteristic, a change in the direction of the softer damping characteristic is allowed only after a predetermined period of time has elapsed.

To ensure that a change in the different transfer directions can always be carried out under the same conditions of the running state quantity, it is proposed that the change in one transfer direction and the change in the other transfer direction are conditional on the occurrence of a respective threshold value of the operating state quantity.

It is possible that the threshold values for the change in one transfer direction and the change in the other transfer direction are equal. However, it is preferable if the threshold values for the change in one transfer direction and the change in the other transfer direction are different. In the latter case, "threshold value hysteresis" occurred in addition to time hysteresis, this threshold value hysteresis preventing a continuous switch between the damping characteristics owing to low-frequency variations of the operating state quantity, i.e. variations of which the period is substantially greater than the predetermined time providing that the amplitude of these variations is smaller than the difference in the threshold values.

To ensure, with respect to safety of travel, that a switch to the harder damping characteristic can always be made immediately, but at the same time to ensure that changes are made at most at a rate of change which is compatible with the service life of the damping modules and the comfort of travel and to guarantee that a change to the softer damping characteristic takes place only when actually required, it is proposed that the change in the direction of the harder damping characteristic takes place on the occurence of a first threshold value signalling a higher damping requirement, in that the running of the predetermined period of time for the change in the direction of the softer damping characteristic is started during the occurrence of a second threshold value which is different from the first and signals a lower damping requirement, and in that the change in the direction of the softer damping characteristic takes place after the predetermined period of time has elapsed, if the first threshold value of the operating state quantity has not been reached again during this predetermined period of time.

By selecting a constant predetermined period of time, a rate of change which is compatible with the service life of the damping modules and the comfort of travel can be predetermined.

However, it is also possible to select the predetermined time in quantitative adaptation to a preceding portion of time during which portion of time the running state quantity signalled a damping requirement which is greater or smaller than the damping requirement corresponding to the threshold values. In this way, the predetermined time can easily be adapted to the dynamics of the operating state quantity, i.e. the timed change behaviour thereof. In this case, it is particularly preferable for the safety of travel (hard damping characteristic=safe travel) that the predetermined period of time after which the change in the direction of the softer damping characteristic is permitted, is selected in quantitative adaptation to a preceding portion of time during which the operating state quantity signals a damping requirement which is greater than the damping requirement corresponding to the first threshold values.

The invention also relates to an apparatus for operatively influencing a damping supporting system which is arranged between a chassis and a vehicle body of a motor vehicle and has at least one damping module arranged between the chassis and the vehicle body, wherein the damping properties of at least part of the damping modules can be changed as a function of at least one operating state quantity sensor between at least two damping characteristics, namely a harder and a softer damping characteristic, in different transfer directions (hard-soft, soft-hard). With the apparatus according to the invention, it is proposed that, for at least one transfer direction, a timer is provided and is linked to the operating state quantity sensor in terms of circuitry such that a change of the damping characteristic in this transfer direction is permitted only after a period of time predetermined by the timer has elapsed. After a change of the damping characteristic in one transfer direction, the timer prevents the output or the coming into effect of a change signal for a change in the other transfer direction before the period of time predetermined by the timer has elapsed. The provision of the timer therefore ensures that the rate of change increases to a maximum to a value compatible with the service life of the damping modules and the comfort of travel.

The various features of novelty which characterise the invention are pointed out with particularity in the claims annexed to and forming a part of the disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

Embodiments of the invention are described in more detail hereinafter with reference to the drawings.

FIG. 1 is a block circuit diagram of an arrangement according to the invention for adjusting different damping stages of a motor vehicle damper.

FIGS. 2 to 7 are block circuit diagrams of the determination arrangements for determining the instantaneous values of the individual damping requirement defining quantities.

FIGS. 14 to 16a, 16b, 16c are illustrations similar to those from FIGS. 11 to 13a, 13b, 13c respectively for a second embodiment.

DETAILED DESCRIPTION OF PREFERRED EMBODIMENTS

The arrangement illustrated in FIG. 1 in the form of a block circuit diagram and hereinafter designated by 10, for adjusting different damping stages of a motor vehicle damper 12 comprises determination arrangements $B_1$–$B_6$ for determining instantaneous values $b_1$–$b_6$ of damping requirement defining quantities. In the present embodiment, the determination arrangements $B_1$–$B_6$ comprise an arrangement $B_1$ for determining the instantaneous value $b_1$ of the transverse acceleration acting on the vehicle, an arrangement $B_2$ for determining the instantaneous value $b_2$ of the transverse jolt, an arrangement $B_3$ for determining the instantaneous value $b_3$ of the longitudinal force acting on the vehicle, an arrangement $B_4$ for determining the instantaneous value $b_4$ of the change in longitudinal force, an arrangement $B_5$ for determining the instantaneous value $b_5$ of the vertical acceleration of the vehicle body and an arrangement $B_6$ for determining the instantaneous value $b_6$ of the vertical acceleration of the wheels. The determination arrangements $B_1$–$B_6$ are described in more detail hereinafter with reference to FIGS. 2 to 7.

FIG. 2 shows a block circuit diagram of the arrangement $B_1$ for determining the transverse acceleration acting on the vehicle. A steering wheel angle sensor $S_1$, for example a goniometer, continuously detects the value of the degree of lock of the steering wheel of the vehicle. A speed sensor $S_2$, for example a tachometer, continuously detects the value of the vehicle speed. The instantaneous value $b_1$ of the transverse acceleration is defined from the values of the two measured quantities in an evaluating arrangement 14. This can be carried out, for example, by means of the "Ackermann equation".

FIG. 3 shows schematically the arrangement $B_2$ for determining the transverse jolt. The value detected by the goniometer $S_1$ of the steering wheel angle is differentiated in time in a differentiator 16 for determining the value of the steering wheel angular velocity. This steering wheel angular velocity is supplied together with the value of the vehicle speed detected by the tachometer $S_2$ to an evaluator 18 which determines the instantaneous value $b_2$ of the transverse jolt from them and prepares it for further processing.

Figure 4:
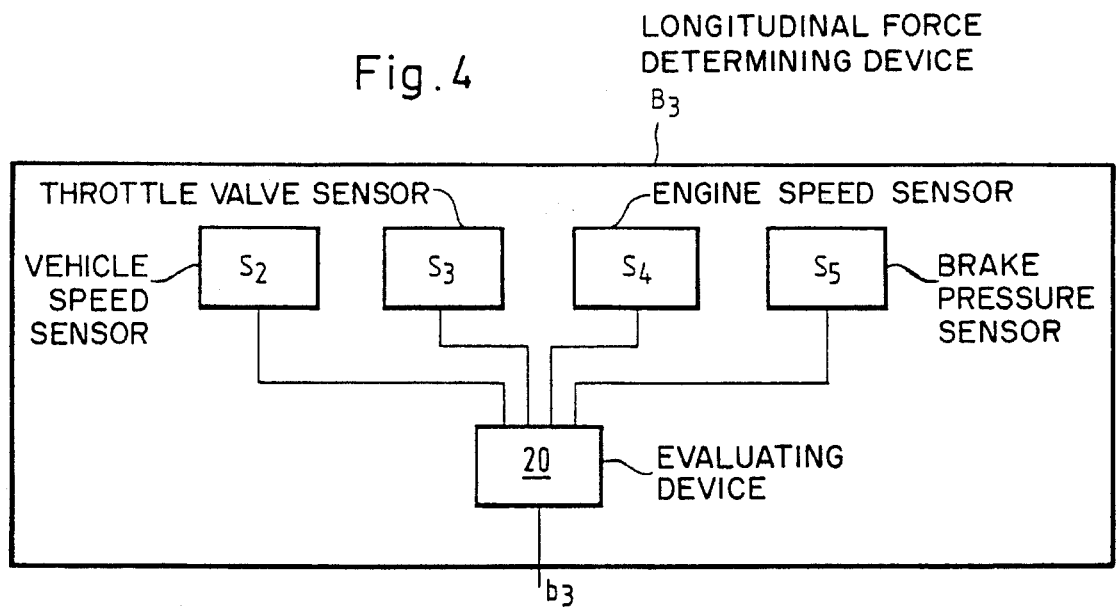

FIG. 4 shows a block circuit diagram of the arrangement $B_3$ for determining the longitudinal force acting on the vehicle. In addition to the value of the vehicle speed detected by the tachometer $S_2$, a throttle valve angle sensor $S_3$, an engine speed sensor $S_4$ and a brake pressure sensor $S_5$ are provided in the arrangement $B_3$. The values of the measured quantities detected by these sensors $S_2$–$S_5$ are supplied to an evaluator 20 for determining the instantaneous value $b_3$ of the longitudinal force.

Figure 5:
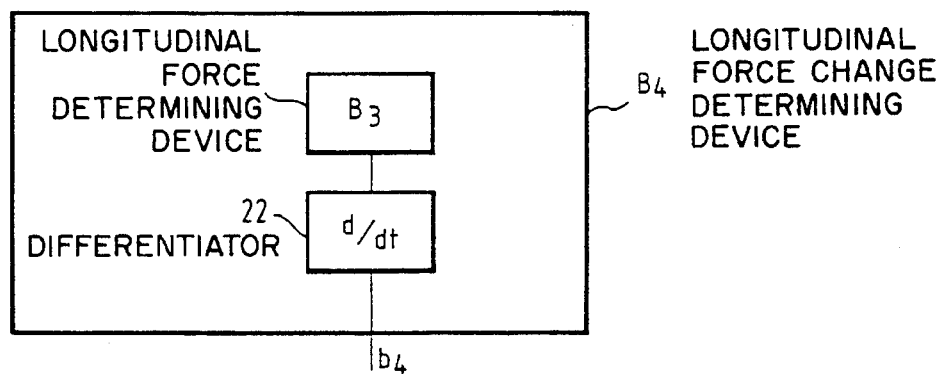

As shown in FIG. 5, the instantaneous value $b_3$ of the longitudinal force is supplied to a differentiator 22 and is differentiated in time by it to determine the instantaneous value $b_4$ of the change in longitudinal force.

As can be inferred from the foregoing, quantities which are characteristic of the state of travel of the vehicle are prepared by the determination arrangements $B_1$–$B_4$. In addition, however, information about the state of the road is also required for assessing the safety of travel and the comfort of travel. Two further determination arrangements $B_5$ and $B_6$ are therefore provided to prepare information about the body acceleration and the wheel acceleration.

Figure 6:
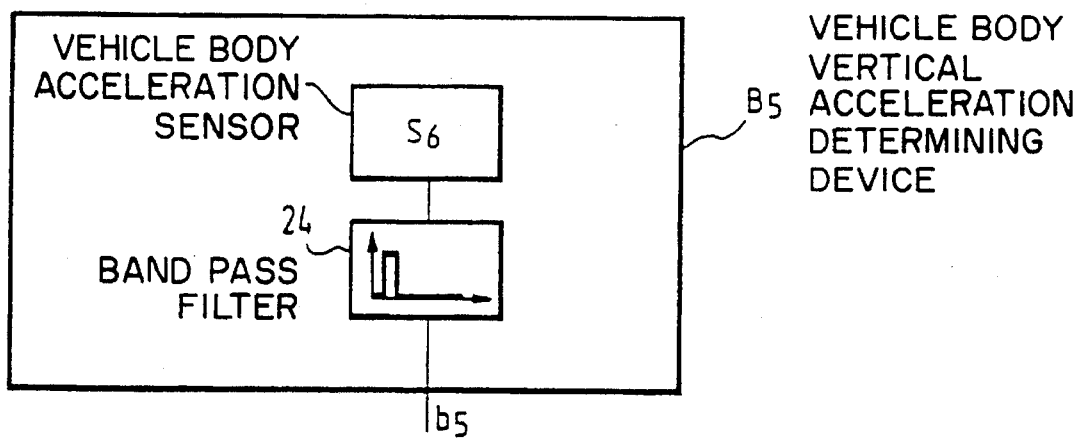

FIG. 6 shows schematically the arrangement $B_5$ for determining the vertical acceleration of the vehicle body. As the safety of travel is dependent mainly on counteracting increasing resonance of the vehicle body, a body acceleration signal detected by an acceleration sensor $S_6$ is evaluated in terms of amplitude and frequency. For this purpose, the body acceleration signal is supplied to a band pass 24 which weights signal contents with a frequency approximately equal to the inherent frequency of the vehicle body, for example 1–2 Hz, particularly markedly. The resultant instantaneous values $b_5$ of the body acceleration are then made available for further processing.

Figure 7:
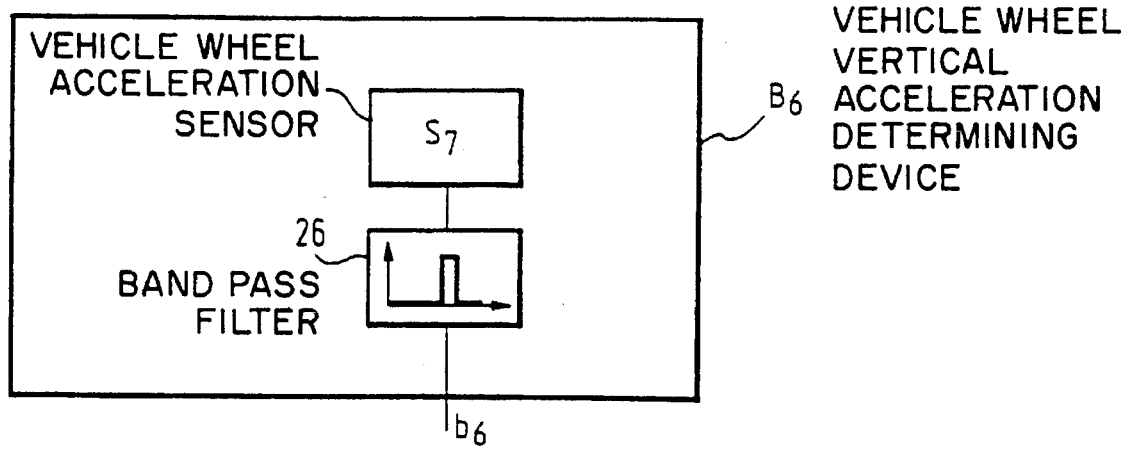

The construction shown in FIG. 7 of the determination arrangement $B_6$ for the wheel acceleration is based on similar considerations. A wheel acceleration sensor $S_7$ detects a signal from the vertical wheel acceleration and transmits it to a band pass 26 which evaluates the signal in terms of amplitude and frequency. The transmission frequency of the band pass 26 is about 12–16 Hz, which corresponds to the inherent frequency of the vehicle wheel suspension means.

Damping requirement contributions $n_1$–$n_6$ of the respective damping requirement defining quantities are calculated from the instantaneous values $b_1$–$b_6$ of the damping requirement defining quantities in computer arrangements $R_1$–$R_6$ (FIG. 1) in accordance with the formula:

$$n_i = v + (1/w)[w(b_i/t_i - v)]^{k_i}, \ i = 1, \ldots, 6 \qquad (I)$$

wherein $v=0$, $w=1$ when $b_i < t_i$ and $v=1$, $w$ dependent on type of running, when $b_i > t_i$.  (Ia)

The quantities $t_1$–$t_6$ designate threshold values of the respective damping requirement defining quantities at which the values of the parameters v and w are changed in the formula (I), and the quantities $k_1$–$k_6$ designate evaluation exponents which reflect the relative significance of the respective damping requirement defining quantities within a total damping requirement value. The parameter w and the threshold values $t_1$–$t_6$ can be dependent on the type of running, in other words can be selected as a function of whether comfortable or sporty travel is desired. The threshold values $t_1$–$t_6$ and the evaluation exponents $k_1$–$k_6$ can be determined, for example, in travel tests. Formula (I) will be discussed in further detail hereinafter.

Figure 8:
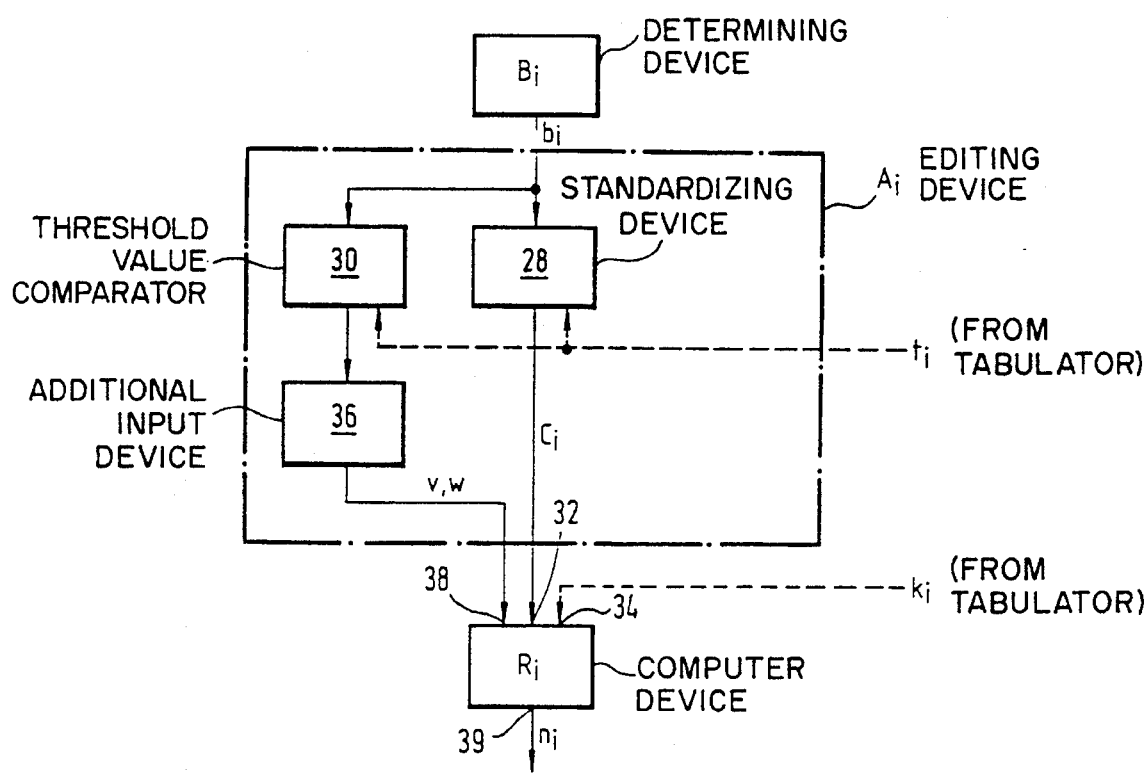
FIG. 8 is a block circuit diagram of an editing arrangement.

In preparation for the calculation of the damping requirement contributions $n_1$–$n_6$, the instantaneous values $b_1$–$b_6$ of the damping requirement defining quantities are transmitted according to FIG. 1 to editing arrangements $A_1$–$A_6$ preceding the computer arrangements $R_1$–$R_6$ in each case. As the editing arrangements are identical in construction in each case, an example of their function can be described in more detail with reference to FIG. 8.

The instantaneous value $b_i$ of the respective damping requirement defining quantity determined by the determination arrangement $B_i$ is transmitted on the one hand to a standardising arrangement 28 and, on the other hand, to a threshold value comparator 30. The standardising arrangement 28 calculates, from the instantaneous value $b_i$ of the damping requirement defining quantity and the threshold value $t_i$ of the respective damping requirement defining quantity supplied to it by a tabulator (not shown), a standardised instantaneous value $c_i$ of the damping requirement defining quantity according to the formula:

$$c_i = b_i/t_i, \; i=1, \ldots, 6. \quad \text{(II)}$$

The standardised instantaneous value $c_i$ of the damping requirement defining quantity is conveyed via a base input 32 to the computer system $R_i$. The tabulator (not shown) supplies the value $k_i$ of the respective evaluation component to the computer system $R_i$ via an exponent input 34.

The tabulator also supplies the threshold value $t_i$ to the threshold value comparator 30. The threshold value comparator 30 checks whether the instantaneous value $b_i$ of the damping defining quantity is smaller than or equal to the threshold value $t_i$ or whether it is higher than the threshold value $t_i$, and conveys a signal corresponding to the result of examination to an additional input device 36. This additional input device 36 transmits values of the parameters v and w corresponding to the conditions (Ia) and the type of running which can be established by the driver, via an additional input 38 to the computer system $R_i$.

The computer systems $R_i$ calculate the respective damping requirement contributions $n_i$ of the individual damping requirement defining quantities from the values supplied to them via the inputs 32, 34 and 38 in accordance with formula (I) and transmit them to an adding arrangement 40 (FIG. 1) which calculates the total damping requirement value n from the individual damping requirement contributions $n_i$ by summation of the individual values.

According to FIG. 1, the total damping requirement value n is conveyed to a first comparator input 42 of a comparator arrangement 44 which compares it with damping stage switch values $l_j$ supplied to a second comparator input 46 by the tabulator. In the case of three different damping stages, namely a soft damping stage, a medium damping stage and a hard damping stage, these are the damping stage switch value $l_1$ for switching between the soft and the medium damping stage and the damping stage switch value $l_2$ for switching between the medium and the hard damping stage.

A damping stage control signal corresponding to the result of comparison is conveyed to a hysteresis element 48 which prevents continuous switching between two damping stages, for example on the basis of a periodic variation in the value n of the total damping requirement round a damping stage switch value $l_j$ (j=1,2).

If the damping stage control signal is also considered permissible by hysteresis element 48, it is conveyed to a tripping arrangement 50 which switches the vibration damper 12 to the damping stage corresponding to the signal.

The working chamber 52 of the embodiment shown in FIG. 1 of a vibration damper 12 is divided by a piston 54 into an upper chamber 56 filled with damping fluid and a lower chamber 58 filled with damping fluid. The two fluid chambers 56 and 58 communicate with one another on the one hand via a throttle section 60 provided in the piston 54 which is formed, for example, by a spring-loaded valve and, on the other hand, via a bypass 62.

In the example shown in FIG. 1, the bypass 62 is divided into two parallel partial sections 64a and 64a. The partial section 64a has a throttle section 66a and an electromagnetically actuable valve 68a, and the partial section 64b has a throttle section 66b and an electro-magnetically actuable valve 68b. It is assumed hereinafter that the throttle section 66a throttles the through-flow more markedly than the throttle section 66b.

The tripping arrangement 50 switches the vibration damper 12 to the desired damping stage in that it opens and closes the electromagnetically actuable valves 68a and 68b according to the respective damping stage control signal. If a hard damping characteristic is required, the two valves 68a and 68b remain closed so that the throttle sections 66a and 66b allocated to them cannot be perfused by damping fluid. The sole-acting connection between the fluid chambers 56 and 58 is therefore the throttle section 60 in the piston 54. The bypass 62 is not perfused. If a medium damping characteristic is desired, the valve 68a is opened while the valve 68b remains closed. The fluid can now flow through the throttle section 60 in the piston 54 and the throttle section 66a in the bypass 62 so that a higher fluid through-put and therefore a medium damping characteristic are achieved. For achieving a soft damping characteristic, the damping valve 68b is opened. The damping fluid can now flow through the throttle section 60 in the piston 54 and the throttle section 66b in the bypass 62. As the throttle section 66b throttles the through-flow more weakly, the fluid flow rate is further increased and the damping characteristic becomes softer.

The trend of the value $n_i$ of the damping requirement contribution as a function of the instantaneous value $b_i$ or of the standardised instantaneous value $c_i$ of a specific damping requirement defining quantity will be discussed hereinafter with reference to FIG. 9. If the instantaneous value $b_i$ of the damping requirement defining quantity is smaller than or equal to the associated threshold value $t_i$ which is dependent on the type of running, in other words if the standardised instantaneous value $c_i$ of the damping requirement defining quantity is smaller than or equal to 1, insertion of condition (Ia) in formula (I) produces:

$$n_i = (b_i/t_i)^{k_i} = c_i^{k_i}. \quad \text{(III)}$$

If the standardised instantaneous value $c_i$ assumes the value 1, this always results in the value 1 for the damping requirement contribution $n_i$ independently of the value $k_i$ of the evaluation exponent. If, on the other hand, the instantaneous value $b_i$ of the damping requirement defining quantity is greater than the associated threshold value $t_i$, i.e. if the standardised instantaneous value $c_i$ of the damping requirements defining quantity is greater than 1, then:

$$n_i = 1 + (1/w)[w(b_i/t_i - 1)]^k i = 1 + (1/w)[w(c_i - 1)]^k i. \quad (IV)$$

If the co-ordinates are now transformed according to the statement $$n'_i = n_i - 1 \text{ and } c'_i = c_i - 1, \quad (V)$$

i.e. if a zero displacement of the co-ordinate intersection is performed according to the foregoing statement, then:

$$n'_i = (1/w)[w \, c'_i]^k i \quad (VI)$$

In addition to the threshold value $t_i$, the parameter w also depends on the type of running which is adjusted at the vehicle and can be selected, for example, by the driver. The steepness with which the power function ascends determines the value of the parameter w. The higher the value of the parameter w, the steeper the power function, which corresponds to a type of running which is increasingly sporty as the damping stage switch value $l_2$ is achieved with ever lower standardised instantaneous values of the damping requirement defining quantities.

Figure 9:
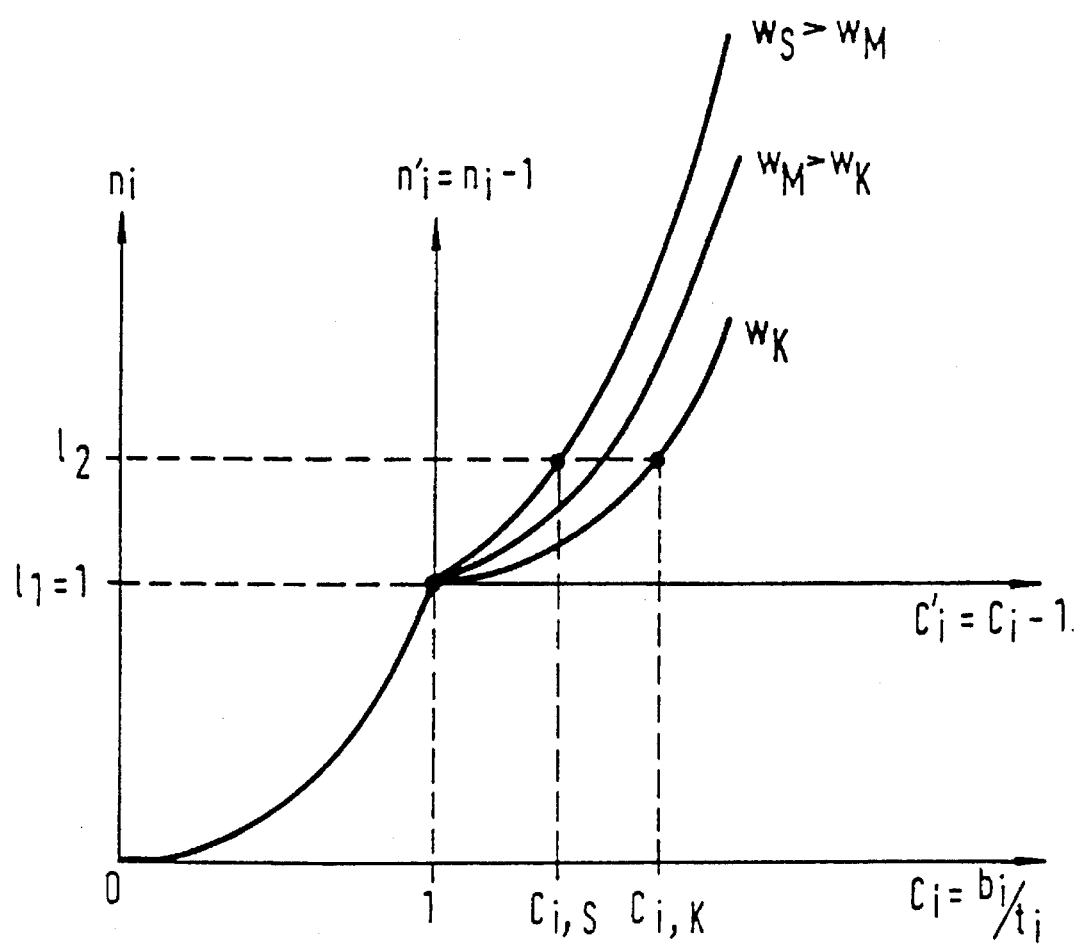
FIG. 9 is a graph illustrating the trend of the power function.

FIG. 9 shows three different curve trends of the damping requirement contribution, more specifically for a value $w_K$ of the parameter w, corresponding to a more comfortable type of running, for a value $w_M$ of the parameter w corresponding to a medium type of running which is greater than the value $w_K$, and for a value $w_S$ of the parameter w corresponding to a sporty type of running which again is greater than the value $w_M$. The dependency of the threshold value $t_i$ on the type of running is not set down in the curve trend in FIG. 9 as the value $n_i$ of the damping requirement contribution is plotted against the standardised instantaneous value $c_i = (b_i/t_i)$ of the damping requirement i defining quantity.

As can be seen in FIG. 9, the total trend of the value $n_i$ of the damping requirement contribution as a function of the standardised instantaneous value $c_i$ of the damping requirement defining quantity is accordingly composed of two curves which run according to a power function in their respective co-ordinate system and, when considered in the co-ordinate system ($n_i$; $c_i$) of the curve according to formula (III), are continuously connected to one another at the co-ordinate point "$c_i = 1$; $n_i = 1$" (see FIG. 9).

In FIG. 9, the damping stage switch values $l_1$ and $l_2$ are also drawn in as broken lines extending parallel to the abscissa axis. It can be inferred from FIG. 9 that the damping stage switch value $l_1$ is selected such that the switch from the soft to the medium damping characteristic takes place precisely at the junction of the two power function curves. This switch from the soft to the medium damping characteristic can take place at lower instantaneous values $b_i$ of the damping requirement defining quantity by using a lower threshold value $t_i$ in order to achieve sporty travel. The trend of the second power function of which the steepness varies according to the type of running, according to formula (VI) (see the three curves $w_K$, $w_M$ and $w_S$) results in the standardised instantaneous values $c_i$, which differ for the respective type of running, of the damping requirement defining quantity at which there is a switch from the medium to the hard damping characteristic. The values $c_{i,S}$ and $C_{i,K}$ for the switch points with sporty and comfortable running are plotted as examples in FIG. 9.

Owing to the division of the curve of the damping requirement contributions into two regions, this curve has an inclination, even in the region of the second switch point, which corresponds substantially to the inclination in the first switch point. Comparable switch conditions are therefore ensured in the two switch points. The instantaneous values $b_i$ and therefore also the standardised instantaneous values $c_i$ of the damping requirement defining quantities are therefore subject to certain variations round a mean value, like every other measured quantity. These variations result in variations in the values $n_i$ of the damping requirement contributions. The greater the inclination of the function connecting the quantities $b_i$ or $c_i$ and $n_i$ at the mean value, the greater the resultant variations in the damping requirement contributions. With a very great inclination, a variation in the damping requirement contribution $n_i$ resulting from a slight variation in the instantaneous value $b_i$ of the damping requirement defining quantity may happen to bring about a switch between the damping stages so that a controlled switch between the damping stages can no longer be ensured. The division of the damping requirement contribution curve into two regions accordingly means that, in the region of the second switch point, this curve has an inclination comparable with the inclination in the first switch point so that a controlled switch over can also be made in the second switch point.

Figure 10:
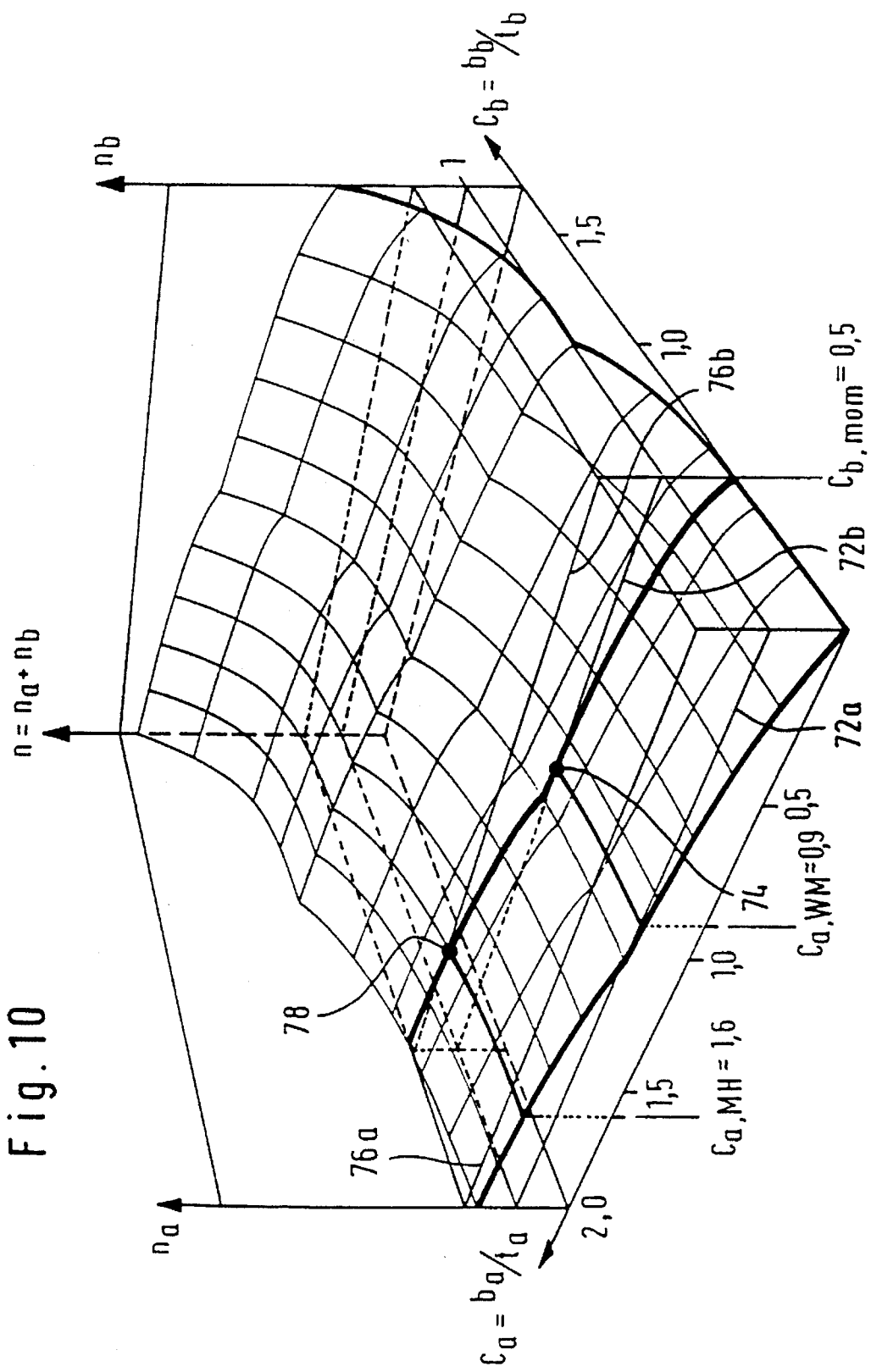
FIG. 10 is an illustration of the co-operation between several damping requirement defining quantities.

The example of two damping requirement defining quantities shown in FIG. 10 serves to illustrate how a switch between the damping stages is achieved by co-operation of several damping requirement defining quantities even through none of the damping requirement defining quantities alone can bring about such a switch. In FIG. 10, the total damping requirement n resulting from the standardised instantaneous values $c_a$ and $c_b$ of the two damping requirement defining quantities is plotted on the ordinate axis over the two standardised instantaneous values $c_a$ and $c_b$ as abscissa axes.

It is assumed that one damping requirement defining quantity has a standardised instantaneous value of $c_{b,mom} = 0.5$. The damping requirement contribution curve, building up on the associated damping requirement contribution value $n_{b,mom}$, of the second damping requirement defining quantity is emphasised in FIG. 10 as a reinforced lime 70. In this example, the damping stage switch value $l_1$ corresponds to a plane which extends in parallel with the plane spreading from the abscissa axes and is shown merely by the lines 72a and 72b for the sake of clarity. The total damping requirement line 70 intersects the damping stage switch value line 72b at a point 74 which is allocated to a standardised instantaneous value $c_{a,WM}$ of the second damping requirement defining quantity. Consequently, a switch is made from the soft into the medium damping characteristic at a standardised instantaneous value $c_{b,mom} = 0.5$ of the first damping requirement defining quantity if the second damping requirement defining quantity has the standardised instantaneous value $c_{a,WM}$. In the example shown in FIG. 10, the instantaneous value $c_{a,WM}$ of the second damping requirement defining quantity is about 0.9 so that the second damping requirement defining quantity alone would not have been able to effect a switch to the medium damping stage. Similarly, the point where a switch is made to the hard damping characteristic is defined as the point of intersection of the total damping requirement line 70 with a line 76b allocated to the second damping stage switch value 12.

In accordance with the foregoing, more than two damping requirement defining quantities can also co-operate to achieve a switch between the damping characteristics of the vibration damper.

The arrangement according to the invention allows computer-aided adjustment of different damping characteristics of a motor vehicle damper while allowing for the state of travel of the motor vehicle and damping requirement defining quantities depending on the state of the road according to a mode of running which can be preselected by the driver. The switch takes place as a function of a value of the total damping requirement determined from the instantaneous values of the damping requirement defining quantities. The respective damping characteristic which is most desirable at any moment in time can be determined in real time so that a first travel situation at the moment of determination of the instantaneous values of the damping requirement defining quantities does not differ from a second travel situation at the moment of adjustment of the damping characteristic required to overcome the first travel situation so greatly that the safety of travel would be negatively influenced. Calculation of the values of the damping requirement contributions according to formula (I) opens up the possibility of adapting the apparatus according to the invention to different vehicles by changing the values made ready in the tabulator of the quantities contained as parameters in the formulae.

The apparatus shown in FIG. 11 in the form of a block circuit diagram and designated hereinafter by 110 serves for switching between two damping characteristics of the damping modules of a vehicle, namely a hard and a soft damping characteristic.

A detecting arrangement 180 detects the value of an operating state or running state quantity BZG of the vehicle and can be formed, for example, by a plurality of sensors with subsequent evaluating and assessing electronics.

Thus, for example, a steering angle sensor, a vehicle speed sensor, a throttle valve angle sensor, an engine speed sensor, a brake pressure sensor, body acceleration sensors and wheel acceleration sensors can be provided. The transverse acceleration acting on the vehicle can be determined from the values of the steering angle and the vehicle speed, for example according to the Ackermann equation. The values of vehicle speed, throttle valve angle, engine speed and brake pressure can be used for determining the longitudinal acceleration. The transverse jolt and the longitudinal jolt can be obtained from transverse and longitudinal acceleration by means of differentiating elements. The signals from the body acceleration sensors and the wheel acceleration sensors can be edited, for example, using amplitude and frequency evaluating circuits. The value of the running state quantity BZG can be obtained from the values of transverse acceleration, transverse jolt, longitudinal acceleration, longitudinal jolt and the amplitude-evaluated and frequency-evaluated body and wheel accelerations.

The detecting arrangement 180 transmits the value of the running state quantity BZG to two comparators 182 and 184. The comparator 182 compares the value of the running state quantity BZG with a switch-up threshold value $H_x$ which is supplied to the comparator 182 by a supply arrangement 186. If the value of the running state quantity BZG exceeds the value of the switch-up threshold value $H_x$, the comparator 182 transmits to a switch device 150 a demand signal for the adjustment of a vibration damper 112 to the hard damping characteristic. The switching device 150 checks whether the vibration damper 112 is already adjusted to the hard damping characteristic. If this is not so, the switching device 150 transmits a closure command to an electromagnetically actuable valve 168.

An interior space 152 in a single tube vibration damper 112 contains a pressure gas-filled compensation chamber 155 limited by a floating piston 153 and is also divided by a piston 154 into an upper working chamber 156 filled with damping fluid and a lower working chamber 158 filled with damping fluid. The two working chambers 156 and 158 communicate on the one hand via at least one throttle section 160 provided in the piston 154, but possibly also via two throttle sections which are selectively permeable as a function of the direction of movement of the piston 154. A throttle section can be formed, for example, by a spring-loaded valve. On the other hand, the two working chambers 156 and 158 are connected via a bypass 162. The bypass 162 has a throttle section 166 and the electromagnetically actuable check valve 168. A closed check valve 168 denotes a hard damping characteristic and an open check valve 168 denotes a soft damping characteristic.

It is stated at this point that the demand for the adjustment of the vibration damper to the hard damping characteristic leads, without delay, to a switch to the hard damping characteristic if the vibration damper is adjusted to the soft damping characteristic. High safety of travel can thus invariably be guaranteed.

If the running state quantity BZG exceeds the value of the switch-up threshold value $H_x$, the comparator 182 still emits a signal for setting a timer 188. The timer 188 receives this signal at a "set" input and is set to a predetermined value $T_{x0}$ by this signal. However, the timer 188 does not yet begin running.

The comparator 184 compares the value of the running state quantity BZG with a switch-down threshold value $R_x$ which is supplied to the comparator 184 by the supply arrangement 186. If the value of the running state quantity falls below the switch-down threshold value $R_x$, the comparator 184 transmits a start signal to the timer 188 which receives this start signal via its "start" input and thereupon allows the previously set duration of time $T_{x0}$ to elapse.

On the other hand, if the value of the running state quantity does not fall below the switch-down threshold value $R_x$, the comparator 184 transmits a continue counting signal to the timer 188. The timer 188 receives this signal at a "continue" input. After receiving the continue counting signal, the timer 188 allows the predetermined duration of time $T_{x0}$ to elapse only when a start signal coming from the comparator 184 has been received since the last reception of a set signal coming from the comparator 182 in the timer 188, i.e. when the value of the running state quantity has fallen below the switch-down threshold value $R_x$ since the switch-up threshold value $H_x$ was last exceeded.

If the value of the running state quantity BZG consequently again exceeds the switch-up threshold value $H_x$, the operation of the timer 188 is interrupted and the timer 88 is again set to the predetermined duration of time $T_{x0}$ and is kept at this time.

The instantaneous value $T_x$ of the timer 188 is conveyed to a comparator 190 which checks whether the predetermined duration of time $T_{x0}$ has elapsed. If so, the comparator 190 transmits to the switching device 150 a demand signal for the adjustment of the vibration damper 112 to the soft damping characteristic. If the electromagnetic valve 168 is closed, the switching device 150 thereupon imparts an opening command to the electromagnetic valve 168.

The timer 188 can be formed, for example, by a counter which is set to a predetermined value on receiving a set signal, reduces this predetermined value by 1 on receiving a start signal and also reduces this value by 1 on receiving a continue counting signal, if a start signal has already been received since the last set signal. However, the timer 188 can also be formed by an independently operating chronometer. In this case it is merely necessary to supply to the timer a set signal for setting to a predetermined value and a start signal for starting the running of the predetermined duration of time.

Figure 11:
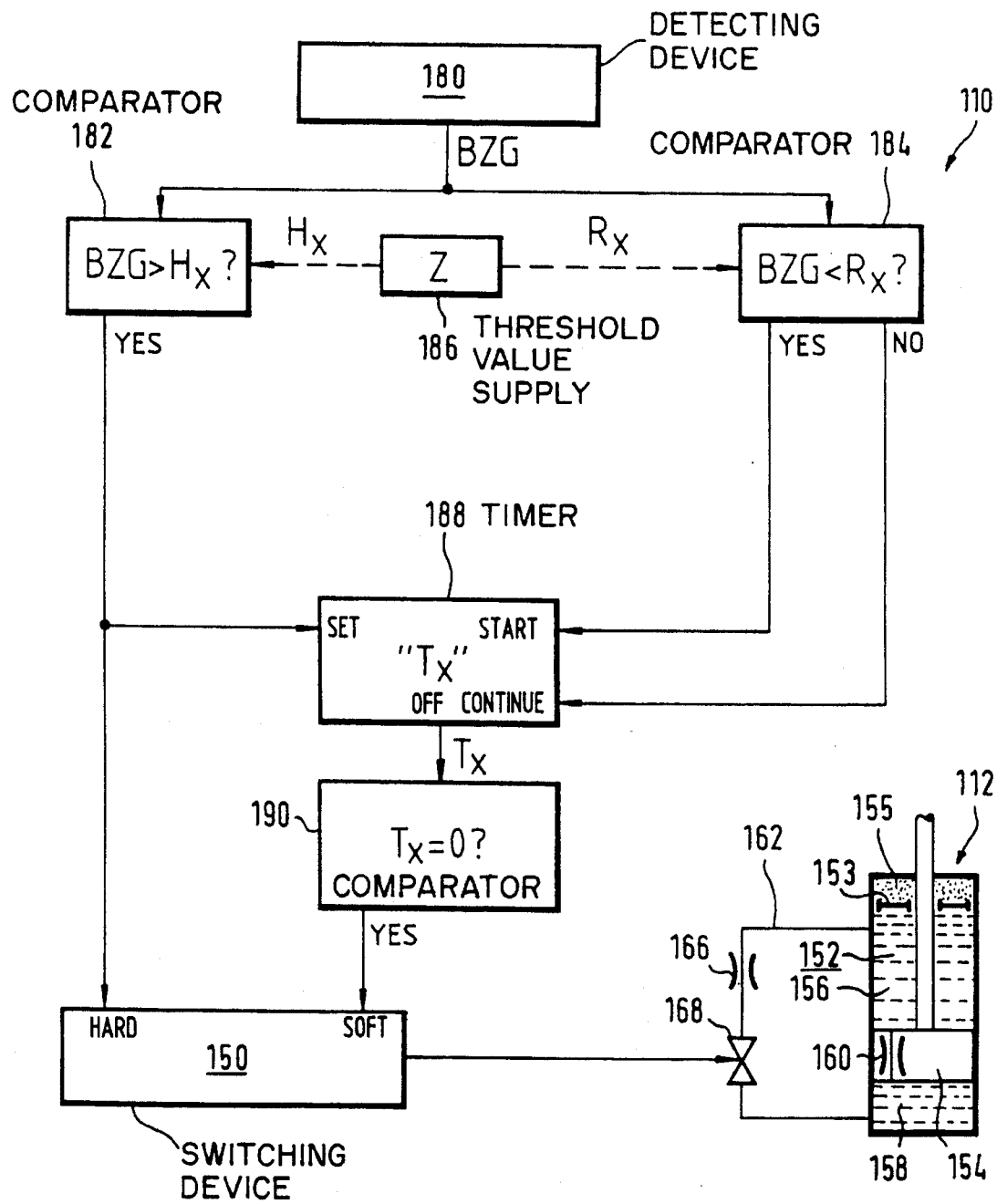
FIG. 11 is a block circuit diagram of a first embodiment of the switch-down delay arrangement according to the invention.
Figure 12:
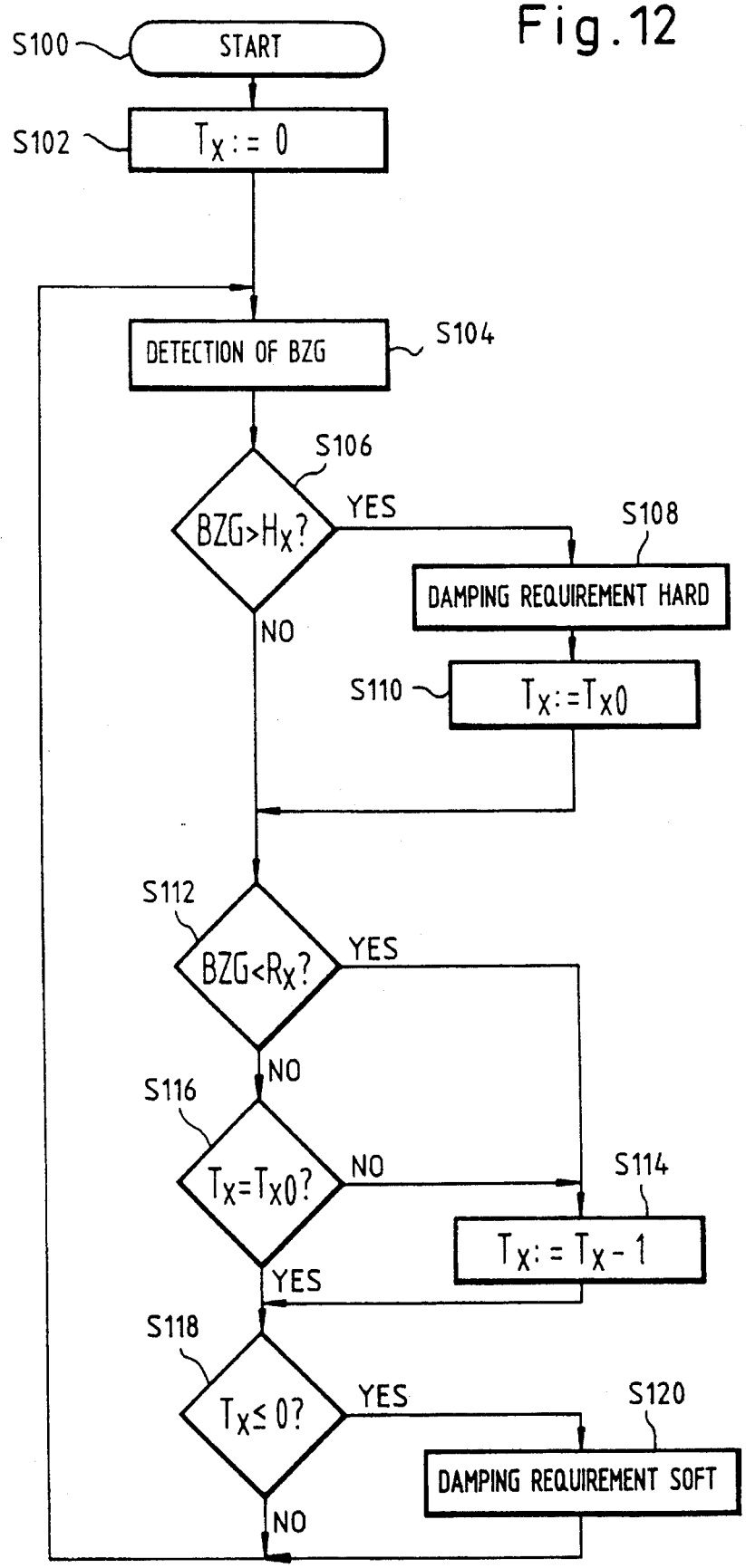
FIG. 12 is a flow chart of a program for running the apparatus from FIG. 11, i.e. for carrying out a switch-down delay.

The apparatus described with reference to FIG. 11 can be run, for example, by means of a program which is shown in FIG. 12 in the form of a flowchart. After the beginning of the program in a step S100, the value of the timer 188 is set to zero in a step S102. In a step S104, the instantaneous value of the operating state quantity BZG is then detected.

The instantaneous value of the running state quantity BZG is checked in step S106 as to whether or not it is greater than the switch-up threshold value $H_x$. If so, the instantaneous value $T_x$ of the timer 188 is set to a predetermined value $T_{x0}$ (step S110) and the requirement for a hard damping characteristic is transmitted to the switching device 150 (step S108). The switching device 150 transmits a closure command to the check valve 168 only when the check valve 168 is in its opened state.

Hereupon, as in the case where it was found in step S106 that the value of the running state quantity BZG does not exceed the switch-up threshold value $H_x$, progress is made to a step S112 where a check is carried out as to whether the value of the operating state quantity BZG is smaller than the switch-down threshold value $R_x$. If so, the value of the timer is reduced by 1 in a step S114 (start signal).

However, if the value of the operating state quantity BZG does not lie below the switch-down threshold value $R_x$, a check is carried out in a step S116 as to whether the timer 188 still has its predetermined value $T_{x0}$. If not, i.e. if the timer 188 has already been started, the value of the timer is reduced by 1 in step S114 (continue counting signal).

After carrying out step S114 and also in the case in which it is found in step S116 that the timer 188 still has its predetermined value $T_{x0}$, a check is carried out in a step S118 as to whether the timer 188 has already run. If so, a soft damping requirement is signalled to the switching device 150 in a step S120. A switch-down to the soft damping characteristic is then carried out only when the switch-down threshold value $R_x$ has been fallen below and has not been exceeded again for the duration $T_{x0}$ of the switch-up threshold value.

Figure 13:
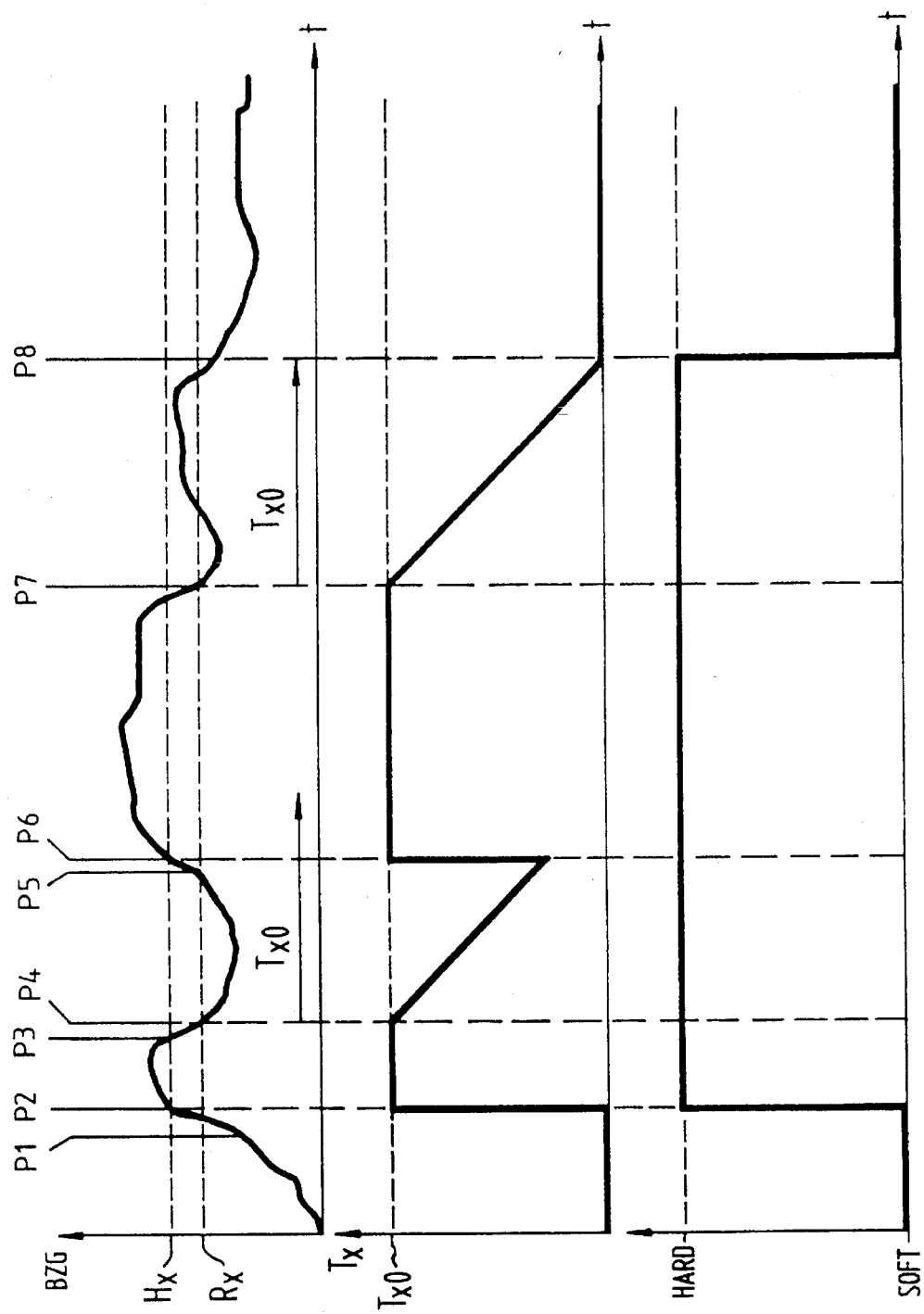
FIG. 13 shows time sequence charts of the operating state variable (FIG. 13a), the value of the timer $T_x$ (FIG. 13b), as well as the damping characteristic (FIG. 13c).

If the timer has not yet run in step S118 or after a soft damping requirement has been signalled in step S120, the program returns to step S104 in that a new instantaneous value of the running state quantity BZG is detected. The running of the device 110 shown in FIG. 11 by means of the program according to FIG. 12 is described in more detail hereinafter with reference to the time sequence charts shown in FIG. 13.

An example of a time sequence chart of the instantaneous value of the running state quantity BZG is sketched in FIG. 13a. The switch-up threshold value $H_x$ and the switch-down threshold value $R_x$ are shown in FIG. 13a as dotted lines extending parallel to the time axis t.

It is assumed that, as shown in FIG. 13c, the vibration damper is initially set to its soft damping characteristic. The running state quantity according to FIG. 13a initially has a value which is lower than the switch-down threshold value $R_x$ (point P1). It is established in step S118 that the timer 188 initialised with the value 0 has run, and the requirement for a soft damping characteristic is signalled in step S120. However, as the vibration damper 112 is already set to the soft damping characteristic, the switching device 150 does not transmit a switch signal to the solenoid valve 168.

According to FIG. 13a, the running state quantity exceeds the switch-up threshold value $H_x$ at a point P2 so that the timer is set to its predetermined value $T_{x0}$ in step S110 (FIG. 13b) and a hard damping requirement is signalled to the switching device 150 in step S108 (FIG. 13c). As the vibration damper 112 was adjusted to its soft damping characteristic until then (FIG. 13c), it is now switched to its hard damping characteristic. This immediate switch to the hard damping characteristic when the switch-up threshold value $H_x$ is exceeded results in greater safety of travel as a harder damping characteristic allows less rocking and pitching movements of the vehicle body than a softer damping characteristic.

Providing the value of the running state quantity BZG lies above the switch-up threshold value $H_x$, the timer 188 is repeatedly set to its predetermined value $T_{x0}$ in step S110. If the running state quantity falls below the switch-up threshold value $H_x$ in point P3 (FIG. 13a), it is found in step S116 that the timer 188 still has its predetermined value $T_{x0}$ and the program advances to step S118 without reducing the timer in step S114.

The timer 188 is started by passing through the program steps S112 and S114 only when the running state quantity in point P4 falls below the switch-down threshold value $R_x$ (FIG. 13b). The value of the timer is continuously reduced by 1 thereafter in step S114 (FIG. 13b). The value of the timer is also further lowered if the running state quantity BZG has again exceeded the switch-down threshold value $R_x$ according to point P5. In this case, although the scan according to step S112 runs negatively, the scan in step S116 also runs negatively as the timer has already been started. Therefore, the timer is also reduced by 1 in step S114 in this case.

The running state quantity BZG again exceeds the switch-up threshold value $H_x$ in point P6 before the predetermined time $T_{x0}$ has elapsed so that the timer 188 is reset to and held at its original value $T_{x0}$. After the switch-down threshold value $R_x$ has been fallen below in point P7, the timer is restarted. In point P8, it is found in step S118 that the timer 188 has run (FIG. 13b), i.e. that the predetermined duration of time $T_{x0}$ has elapsed since the timer 188 started without the running state quantity BZG exceeding the switch-up threshold value $H_x$ again. Soft damping requirement is then signalled in step S120 and a switch down to the soft damping characteristic is effected (FIG. 13c).

In the present embodiment, the switch down to the soft damping characteristic has been carried out by means of a constantly selected predetermined duration of time $T_{x0}$. However, it is similarly possible to select the predetermined duration of time variably. This is described in more detail hereinafter with reference to a second embodiment illustrated in FIGS. 14 to 16. This embodiment corresponds essentially to the first embodiment. Similar parts are therefore provided with the same reference numerals as in the first embodiment, but increased by the number 100.

Figure 14:
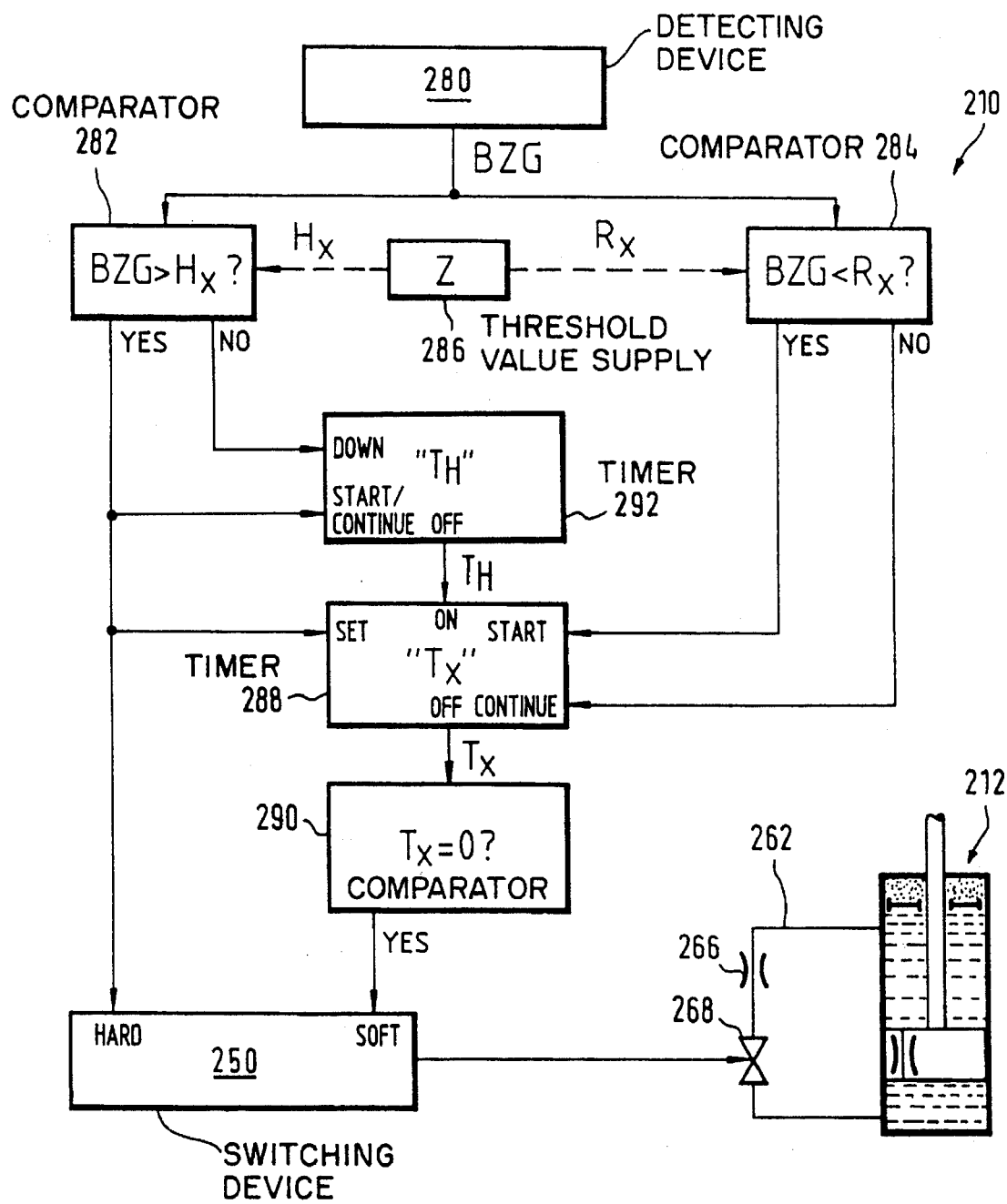

The apparatus according to FIG. 14 differs from the apparatus according to FIG. 11 in that a further timer 292 is provided in addition to the timer 288, which is responsible for the switch-down delay, for measuring the duration of time $T_H$ for which the running state quantity BZG lies above the switch-up threshold value $H_x$. This timer 292 is then reset to zero by the comparator 282 whenever it is found that the running state quantity BZG falls below the switch-up threshold value $H_x$. In this case, the comparator 282 emits a reset signal which is received by the timer 292 via a "down" input.

If, on the other hand, it is found that the running state quantity BZG exceeds the switch-up threshold value $H_x$, the comparator 282 transmits to the timer 292 a continue counting signal which is received by the timer 292 at a "start/continue" input and causes the timer 292 to count the duration of time $T_H$.

The timer 292 conveys the instantaneous value of the time duration $T_H$ continuously to the timer 288. The timer 288 utilises this instantaneous value $T_H$ when receiving a setting signal from the comparator 282 to define the predetermined time value $T_{x0}$. For example, a proportional dependency of the time value $T_{x0}$ on the time duration $T_H$ can be used during this defining operation.

Otherwise, the second embodiment corresponds to the first embodiment, and reference will be made here to the description thereof.

Figure 15:
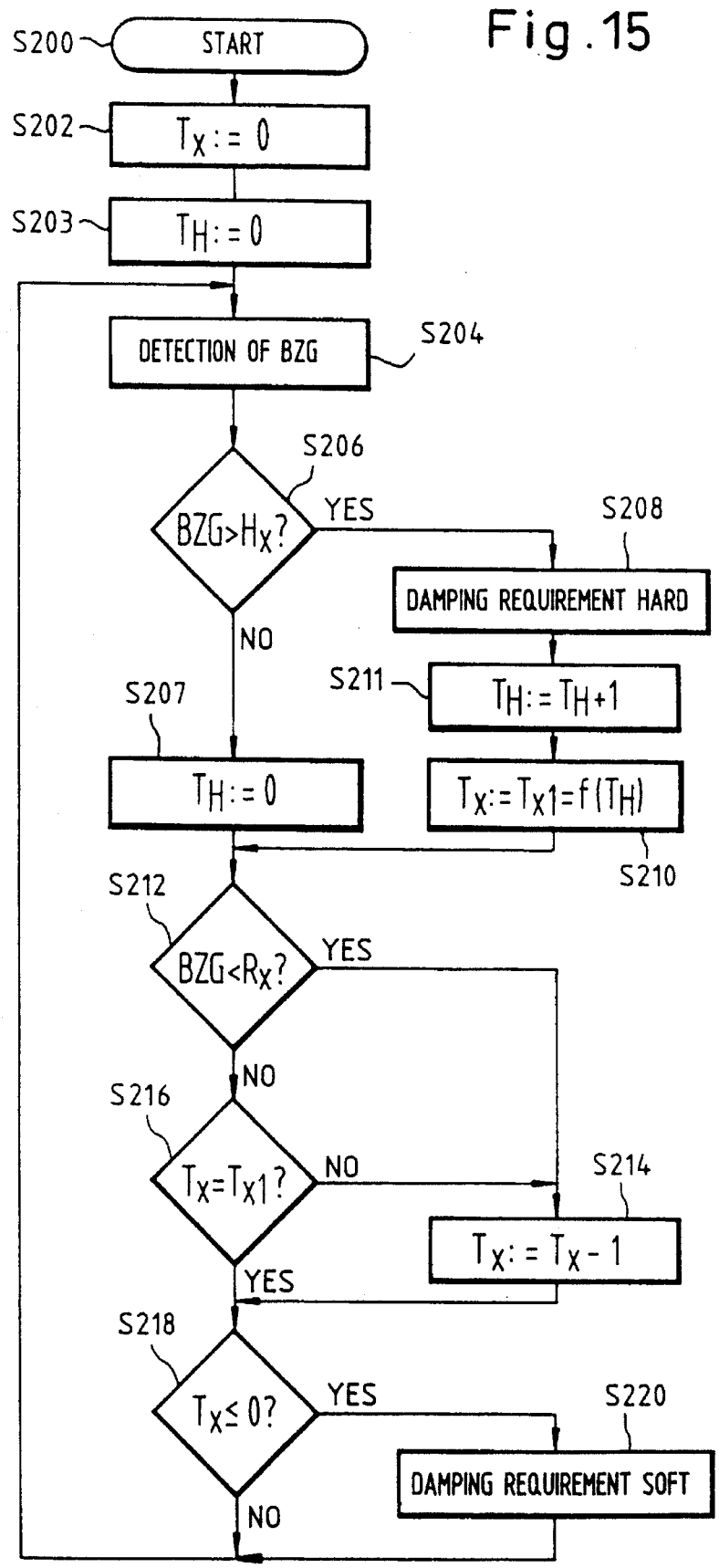

The flowchart according to FIG. 15 relating to the running of the apparatus according to the second embodiment corresponds substantially to the flowchart according to FIG. 12 relating to the running of the apparatus of the first embodiment. Similar steps are therefore provided with identical step reference numerals but increased by the number 100.

Apart from an additional initialisation step S203 in which the value $T_H$ of the timer 292 is set to zero, the flowchart according to FIG. 15 differs from the flowchart according to FIG. 12 by the additional steps S207 and S211. In step S207, the value of the timer 292 is reset to zero if it is previously found in step S206 that the running state quantity BZG does not exceed the switch-up threshold value $H_x$. In step S211, on the other hand, the value $T_H$ of the timer 292 is increased by 1 if it has previously been found in step S206 that the value of the running state quantity BZG exceeds the switch-up threshold value $H_x$. Furthermore, the predetermined time duration $T_{x1}$ to which the timer 288 is set is defined in step S211 as a function of the instantaneous value $T_H$ of the timer 292.

Otherwise, the flowchart according to FIG. 15 corresponds to the flowchart according to FIG. 12, and reference is made here to the description thereof.

The running of the second embodiment of the apparatus according to the invention according to FIG. 14 by means of the program according to FIG. 15 will be described in more detail hereinafter with reference to the time sequence charts in FIG. 16.

If the running state quantity BZG exceeds the switch-up threshold value $H_x$ in point P10 (FIG. 16a), the timer 292 is started in step S211 and the timer 288 is set in step S210 to a value $T_{x1}$ defined as a function of the value $T_H$ of the timer 292, a proportional dependency between the two quantities having been selected according to FIG. 16b. Providing that the running state quantity BZG lies above the switch-up threshold value $H_x$, the value of the timer 292 and therefore also the value $T_x$ of the timer 288 is increased continuously.

If the running state quantity BZG again falls below the switch-up threshold value $H_x$ in point P11, the timer 292 remains at a standstill and the timer 288 remains set at the value last defined from the value of the timer 292. If the running state quantity BZG falls below the reset threshold value $R_x$ in point P12, the timer 288 is started (steps S212, S214) and begins to elapse. After the predetermined duration of time $T_{x1}$ has elapsed in point P13 (FIG. 16b), a soft damping requirement is signalled (FIG. 16c; steps S218 and S220 in FIG. 15) and the electromagnetic valve of the vibration damper 220 is opened by the switch device 250 (FIG. 14).

In step P14, the value of the running state quantity BZG again exceeds the switch-up threshold value $H_x$ and falls below it again at point P15. As the time duration covered between the moments corresponding to points P14 and P15 is very much longer than the time duration covered between the points in time corresponding to points P10 and P11, the timer 288 is fixed at a higher value $T_{x1}$ than was previously the case. After the switch-down threshold value $R_x$ has been fallen below in point P16, the running of the time $T_{x1}$ is started and, after this time has elapsed, is switched back down to the soft damping characteristic in point P17 (FIG. 16c).

Even though different threshold values $H_x$ and $R_x$ have been used in the explanation of the previous examples for the switching to the harder damping characteristic and the switching down to the softer damping characteristic, these threshold values can also be selected the same. The selection of different threshold values $H_x$, $R_x$ has the advantage that quasi-stationary, i.e. low frequency changes in the running state quantity signal cannot lead to an undesirable to-and-fro switching between the damping characteristics in this case.

Two embodiments of the principle of the switch-down delay have been described hereinbefore, in which the vibration dampers provided merely two damping characteristics. However, the process can advantageously also be used for a switch-down delay with vibration dampers having several damping characteristics. In this case, it is merely necessary to provide a plurality of timers corresponding to the timer 188 or 288. For example, two such timers have to be provided in the case of three damping characteristics, namely a hard, a medium and a soft damping characteristic. In this case, one timer is set when a switch-up threshold value $H_{MH}$ from the medium to the hard damping characteristic is exceeded and the other timer is set when a switch-up threshold value $H_{WM}$ from the soft to medium damping characteristic is exceeded. One timer is started when a switch-down threshold $R_{HM}$ from the hard to the medium damping characteristic is fallen below. However, the other timer is started when a switch-down threshold value $R_{MW}$ from the medium to the soft damping characteristic is fallen below, if one timer has already elapsed.

After the timers have run, the damping characteristic desired at the moment of running is switched to. If, for example, the hard damping characteristic is adjusted first of all and the running state quantity BZG falls below the switch-down threshold value $R_{HM}$ from the hard to the medium damping characteristic, one timer is started. If the running state quantity BZG falls, before one timer has run, below the switch-down threshold value $R_{MW}$ from the medium to the soft damping characteristic, the other timer is not started as one timer is still running. If the value of the running state quantity BZG still lies below the switch-down threshold value $R_{MW}$ from the medium to the soft damping characteristic when one timer is running, there is a direct switch from the hard to the soft damping characteristic.

A process and an apparatus have been proposed hereinbefore for influencing the running of a damping support system arranged between a chassis and a vehicle body of a motor vehicle, the support system having at least one damping module arranged between the chassis and the vehicle body. With this process and this apparatus, the damping properties of at least a portion of the damping modules is changed as a function of at least one running state quantity between at least two damping characteristics, namely a harder and a softer damping characteristic in different transfer directions (hard-soft, soft-hard). After a change in one transfer direction, a change in the other transfer direction is only permitted after a specified period of time predetermined by a timer has elapsed.

While specific embodiments of the invention have been shown and described in detail to illustrate the application of the inventive principles, it will be understood that the invention may be embodied otherwise without departing from such principles.

The references numerals in the claims are only used for facilitating the understanding and are by no means restrictive.

We claim:

1. A method for operatively influencing the damping properties of a damping module arranged between a vehicle wheel and a vehicle body of a motor vehicle, as a function of damping requirement defining quantities including at least one of transverse acceleration, transverse jolt, longitudinal force, longitudinal force change, frequency-evaluated vehicle body acceleration and frequency-evaluated vehicle wheel acceleration, with which method the damping properties of the damping module are changed between at least two damping characteristics, said method comprising the steps of:

(a) determining instantaneous values of said damping requirement defining quantities;

(b) converting said instantaneous values of said damping requirement defining quantities according to respective power functions into instantaneous values of damping requirement contributions, the base of a respective power function comprising the respective damping requirement defining quantity and the exponent of the respective power function defining a relative significance of the respective damping requirement defining quantity within a total damping requirement;

(c) adding said instantaneous values of said damping requirement contributions of the damping requirement defining quantities to provide said total damping requirement;

(d) comparing said total damping requirement with a damping characteristic switching value; and (e) switching the damping module to a respective next damping characteristic, when said total damping requirement and said damping characteristic switching value are substantially equal.

2. A method according to claim 1 for a damping module having more than two damping characteristics, wherein when a threshold value of a respective damping requirement defining quantity is exceeded, the respective power function is changed such that for a further increase of the respective instantaneous value of the respective damping requirement defining quantity, a zero point displacement of the respective power function is performed, said zero point displacement comprising an abscissa displacement to the threshold value of the respective damping requirement defining quantity and an ordinate displacement to the respective instantaneous value of the respective damping requirement contribution according to the non-displaced respective power function.

3. A method for operatively influencing the damping properties of a damping module arranged between a vehicle wheel and a vehicle body of a motor vehicle, as a function of damping requirement defining quantities including at least one of transverse acceleration, transverse jolt, longitudinal force, longitudinal force change, frequency-evaluated vehicle body acceleration and frequency-evaluated vehicle wheel acceleration, with which method the damping properties of the damping module are changed between at least three damping characteristics, said method comprising the steps of:

(a) determining instantaneous values of said damping requirement defining quantities;

(b) converting said instantaneous values of said damping requirement defining quantities according to respective power functions into instantaneous values of damping requirement contributions, the base of a respective power function comprising the respective damping requirement defining quantity and the exponent of the respective power function defining a relative significance of the respective damping requirement defining quantity within a total damping requirement, and, when a threshold value of a respective damping requirement defining quantity is exceeded, the respective power function being changed such that for a further increase of the respective instantaneous value of the respective damping requirement defining quantity, a zero point displacement of the respective power function is performed, said zero point displacement comprising an abscissa displacement to the threshold value of the respective damping requirement defining quantity and an ordinate displacement to the respective instantaneous value of the respective damping requirement contribution according to the non-displaced respective power function;

(c) adding said instantaneous values of said damping requirement contributions of the damping requirement defining quantities to provide said total damping requirement;

(d) comparing said total damping requirement with a damping characteristic switching value; and (e) switching the damping module to a respective next damping characteristic, when said total damping requirement and said damping characteristic switching value are substantially equal.

4. A method according to claim 2 or claim 3, wherein during the change of the respective power function, a multiplication factor associated with the base of the respective power function is changed.

5. A method according to claim 4, wherein at least one of the threshold value and the multiplication factor is selected according to an operating mode which is operationally constant or adjustable by the driver.

6. A device for operatively influencing the damping properties of a damping module arranged between a vehicle wheel and a vehicle body of a motor vehicle, as a function of damping requirement defining quantities including at least one of transverse acceleration, transverse jolt, longitudinal force, longitudinal force change, frequency-evaluated vehicle body acceleration and frequency-evaluated vehicle wheel acceleration, the damping properties of the damping module being changed between at least two damping characteristics, said device comprising:

(a) determining means for determining instantaneous values of the damping requirement defining quantities;

(b) computing means for converting said instantaneous values of said damping requirement defining quantities according to respective power functions into instantaneous values of damping requirement contributions, said computing means having a base input for inputting a respective instantaneous value of the respective damping requirement defining quantity as a base of a respective power function, an exponent input for inputting a relative significance of the respective damping requirement defining quantity within a total damping requirement as an exponent of said respective power function, and a computer output for outputting the instantaneous value of the respective damping requirement contribution;

(c) adding means connected to said computer output of said computing means, for adding said instantaneous values of said damping requirement contributions of the damping requirement defining quantities to provide said total damping requirement, said adding means having a summation output for outputting a value of said total damping requirement;

(d) a comparator having a first comparator input connected to the summation output of said adding means, a second comparator input for inputting a damping characteristic switching value and a comparator output for outputting a damping characteristic control signal when said total damping requirement and said damping characteristic switching value are approximately equal; and (e) a tripping device connected to the comparator output, for initiating a change of the damping module to a respective next damping characteristic on occurrence of said damping characteristic control signal at the comparator output.

7. A device according to claim 6 for a damping module having more than two damping characteristics, wherein each determining means is allocated a threshold comparator which loads an additional input device of the computing means when a threshold value of a respective damping requirement defining quantity is exceeded, in order to change the respective power function such that for a further increase of said respective damping requirement defining quantity, a zero point displacement of the respective power function is performed, said zero point displacement comprising an abscissa displacement to the threshold value of the respective damping requirement defining quantity and an ordinate displacement to the respective instantaneous value of the respective damping requirement contribution according to the non-displaced respective power function.

8. A device for operatively influencing the damping properties of a damping module arranged between a vehicle wheel and a vehicle body of a motor vehicle, as a function of damping requirement defining quantities including at least one of transverse acceleration, transverse jolt, longitudinal force, longitudinal force change, frequency-evaluated vehicle body acceleration and frequency-evaluated vehicle wheel acceleration, the damping properties of the damping module being changed between at least three damping characteristics, said device comprising:

(a) determining means for determining instantaneous values of the damping requirement defining quantities;

(b) computing means for converting said instantaneous values of said damping requirement defining quantities according to respective power functions into instantaneous values of damping requirement contributions, said computing means having a base input for inputting a respective instantaneous value of the respective damping requirement defining quantity as a base of a respective power function, an exponent input for inputting a relative significance of the respective damping requirement defining quantity within a total damping requirement as an exponent of said respective power function, and a computer output for outputting the instantaneous value of the respective damping requirement contribution, said determining means being allocated a threshold comparator which loads an additional input device of the computing means when a threshold value of a respective damping requirement defining quantity is exceeded, in order to change the respective power function such that for a further increase of said respective damping requirement defining quantity, a zero point displacement of the respective power function is performed, said zero point displacement comprising an abscissa displacement to the threshold value of the respective damping requirement defining quantity and an ordinate displacement to the respective instantaneous value of the respective damping requirement contribution according to the non-displaced respective power function;

(c) adding means connected to said computer output of said computing means, for adding said instantaneous values of said damping requirement contributions of the damping requirement defining quantities to provide said total damping requirement, said adding means having a summation output for outputting a value of said total damping requirement;

(d) a comparator having a first comparator input connected to the summation output of said adding means, a second comparator input for inputting a damping characteristic switching value and a comparator output for outputting a damping characteristic control signal when said total damping requirement and said damping characteristic switching value are approximately equal; and (e) a tripping device connected to the comparator output, for initiating a change of the damping module to a respective next damping characteristic on occurrence of said damping characteristic control signal at the comparator output.

9. A device according to claim 7 or claim 8, wherein the additional input device is designed for inputting a multiplication factor which is to be multiplied with the base of the respective power function.

10. A device according to claim 9, wherein the base input of the computing means, the threshold value comparator and the additional input device are connected to a tabulator providing at least one of the threshold value and the multiplication factor according to an operating mode which is operationally constant or adjustable by the driver.

11. A method for changing the damping properties of at least one damping module arranged between a vehicle wheel and a vehicle body of a motor vehicle, said damping properties being changed between at least a harder damping characteristic and a softer damping characteristic in one of a harder-to-softer transfer direction and a softer-to-harder transfer direction by varying a fluid flow resistance for a damping fluid flowing through said damping module, said method comprising:

detecting the value of at least one operating state quantity signalling a damping requirement of said damping module;

monitoring the occurrence of first and second threshold values of the operating state quantity, the presence of said first threshold value being necessary for a change in one of said harder-to-softer transfer direction and said softer-to-harder transfer direction and the presence of said second threshold value being necessary for a change in other one of said harder-to-softer transfer direction and said softer-to-harder transfer direction;

upon the occurrence of said first threshold value causing a change in said one of said harder-to-softer transfer direction and said softer-to-harder transfer direction, and measuring a first time interval during which the operating state quantity signals a damping requirement which is one of greater and smaller than the damping requirement corresponding to said first threshold value;

upon the occurrence of said second threshold value, running a second time interval determined as a predetermined function of said first time interval; and permitting a change in said other one of said harder-to-softer transfer direction and said softer-to-harder transfer direction only after said second time interval has elapsed.

12. The method according to claim 11, wherein after a change in the softer-to-harder transfer direction, a change in the harder-to-softer transfer direction is permitted only after said second time interval has elapsed.

13. The method according to claim 11, wherein the first threshold value for a change in said one of said harder-to-softer transfer direction and said softer-to-harder transfer direction and the second threshold value for a change in said other one of said harder-to-softer transfer direction and said softer-to-harder transfer direction are equal.

14. The method according to claim 11, wherein the first threshold value for a change in said one of said harder-to-softer transfer direction and said softer-to-harder transfer direction and the second threshold value for a change in said other one of said harder-to-softer transfer direction and said softer-to-harder transfer direction are different.

15. The method according to claim 11, wherein the first time interval is a time interval during which the operating state quantity signals a damping requirement which is greater than the damping requirement corresponding to the first threshold value.

16. The method according to claim 14, wherein:

the change in the softer-to-harder transfer direction is performed on occurrence of the first threshold value signalling a higher damping requirement;

running of the second time interval required to precede the change in the harder-to-softer transfer direction is started upon the occurrence of the second threshold value signalling a lower damping requirement; and the change in the harder-to-softer transfer direction is performed after the second time interval has elapsed if the first threshold value of the operating state quantity has not been reached again during said second time interval.

17. A device for changing the damping properties of at least one damping module arranged between a vehicle wheel and a vehicle body of a motor vehicle, said damping properties being changed between at least a harder damping characteristic and a softer damping characteristic in one of a harder-to-softer transfer direction and a softer-to-harder transfer direction by varying a fluid flow resistance for a damping fluid flowing through said damping module, said device comprising:

at least one operating-state-quantity sensor for detecting the value of at least one operating state quantity signalling a damping requirement of said damping module;

at least one threshold value comparator connected to said at least one operating-state-quantity sensor for monitoring the occurrence of first and second threshold values of the operating state quantity, the presence of said first threshold value being necessary for a change in one of said harder-to-softer transfer direction and said softer-to-harder transfer direction and the presence of said second threshold value being necessary for a change in other one of said harder-to-softer transfer direction and said softer-to-harder transfer direction;

time measuring means connected to said at least one threshold value comparator and measuring, upon a change in said one of said harder-to-softer transfer direction and said softer-to-harder transfer direction, a first time interval during which the operating state quantity signals a damping requirement which is one of greater and smaller than the damping requirement corresponding to said first threshold value; and timer means connected to said time measuring means and being adjustable to a second time interval determined as a predetermined function of said first time interval measured by said time measuring means, for running, upon the occurrence of said second threshold value, said second time interval and permitting a change in said other one of said harder-to-softer transfer direction and said softer-to-harder transfer direction only after said second time interval has elapsed.

18. The device according to claim 17, wherein the timer means is provided for the harder-to-softer transfer direction.

19. The device according to claim 17 comprising two threshold value comparators connected to said at least one operating state quantity sensor, a first threshold value comparator being adjusted to said first threshold value and a second threshold value comparator being adjusted to said second threshold value, said first and second threshold values being different.

20. The device according to claim 19, wherein said first threshold value comparator is adjusted to said first threshold value signalling a higher damping requirement and is connected to a damping characteristic switching element of said at least one damping module such that a change in the softer-to-harder transfer direction is initiated upon the occurrence of said first threshold value without delay, and wherein said second threshold value comparator is adjusted to said second threshold value signalling a lower damping requirement, said second threshold value comparator being connected, together with the timer means, to said damping characteristic switching element of said at least one damping module for initiating a change in the harder-to-softer transfer direction after said second time interval has elapsed if said first threshold value of the operating state quantity has not been reached again during said second time interval.

* * * * *